United States Patent
Tamanini et al.

(10) Patent No.: US 10,270,771 B1
(45) Date of Patent: Apr. 23, 2019

(54) MID-SESSION LIVE USER AUTHENTICATION

(71) Applicants: Gregory Tamanini, Clawson, MI (US); Patrick Hartford, Macomb Township, MI (US)

(72) Inventors: Gregory Tamanini, Clawson, MI (US); Patrick Hartford, Macomb Township, MI (US)

(*) Notice: Subject to any disclaimer, the term of this patent is extended or adjusted under 35 U.S.C. 154(b) by 0 days.

(21) Appl. No.: 16/019,952

(22) Filed: Jun. 27, 2018

(51) Int. Cl.
*H04L 29/00* (2006.01)
*H04L 29/06* (2006.01)
*G06F 17/30* (2006.01)
*G06K 19/06* (2006.01)

(52) U.S. Cl.
CPC .... *H04L 63/0884* (2013.01); *G06F 17/30879* (2013.01); *G06F 17/30887* (2013.01); *H04L 63/18* (2013.01); *G06K 19/06037* (2013.01)

(58) Field of Classification Search
None
See application file for complete search history.

(56) References Cited

U.S. PATENT DOCUMENTS

| 8,407,482 B2 * | 3/2013 | Ghosh | H04L 29/12594 713/189 |
| 2016/0127363 A1 * | 5/2016 | Vea Orte | G06F 21/32 726/4 |

* cited by examiner

*Primary Examiner* — Ghazal B Shehni
(74) *Attorney, Agent, or Firm* — Kilpatrick Townsend & Stockton LLP

(57) ABSTRACT

A method of authenticating a user identification during an interactive communication session includes, determining that a current step in the interactive communication session requires the user identification to be authenticated after initiating the current step in the interactive communication session and before initiating a subsequent step in the interactive communication session. The method also includes generating URL that includes an identifier that identifies the interactive communication session; encoding the URL in a graphic pattern; and transmitting the graphic pattern to a first client device. The method also includes receiving a transmission from a second client device that includes a representation of the user identification; determining whether the user identification is authentic using at least the representation of the user identification; and initiating the subsequent step in the interactive communication session based on the identifier.

20 Claims, 25 Drawing Sheets https://remotesigning.acme.com/api/snapshot/132165465132/159846351/45687438413

MID-SESSION LIVE USER AUTHENTICATION

TECHNICAL FIELD

This application discloses technology related to the fields of verifying a user ID during an online communication session. In particular, this technology uses live, photographic captures of a user ID obtained through a client device to authenticate the validity of the user ID during an interactive session in which live verification may be required.

BACKGROUND

Resources can be protected by a number of different methods. Different standards and/or organizations may use different resource protection policies to guarantee that resources are adequately protected. Furthermore, a multitude of different resource protection systems may be available for general resource protection, and may be made available to resource owners through a network interface. These different resource protection systems may be spread across different servers operated by many different entities. Each of the resource protection systems and/or each of the particular protection policy employed by the systems may be individually tailored to particular resources or locations. Because each resource protection policy may be unique in at least a few respects, the methods of characterizing these protection policies and determining whether they meet external requirements for resource protection are as varied as the resource protection policies themselves.

In order to grant access to protected resources, systems may use many different methods to verify the identity of a user. Users typically provide some form of credential, such as a username, a password, a biometric token, an indication of user knowledge (e.g., an answer to a personal question), and other forms of user information that may not be easily spoofed when provided in combination and/or with limited tries. During a face-to-face session, forms of photographic identification issued by trusted third party, such as a government agency, can be compared to a person's physical appearance to verify their identity. However, this type of live verification is not possible during an automated session with proper controls to guarantee authenticity.

SUMMARY

In some embodiments, a method of authenticating a user identification during an interactive communication session may include determining, at a server, that a current step in the interactive communication session requires the user identification to be authenticated after initiating the current step in the interactive communication session and before initiating a subsequent step in the interactive communication session. The method may also include generating, at the server, a Uniform Resource Locator (URL) that comprises an identifier that identifies the interactive communication session; encoding, at the server, the URL in a graphic pattern; and transmitting, from the server, the graphic pattern to a first client device. The method may additionally include receiving, at the server, a transmission from a second client device. The transmission may be sent to the URL, and the transmission may include a representation of the user identification. The method may further include determining whether the user identification is authentic using at least the representation of the user identification; and initiating, at the server, the subsequent step in the interactive communication session based at least in part on the identifier that identifies the interactive communication session in the URL and a determination that the user identification is authentic.

In some embodiments, a computer-readable, non-transitory medium may include instructions that, when executed by one or more processors, cause the one or more processors to perform operations including determining, at a server, that a current step in the interactive communication session requires the user identification to be authenticated after initiating the current step in the interactive communication session and before initiating a subsequent step in the interactive communication session. The operations may also include generating, at the server, a Uniform Resource Locator (URL) that comprises an identifier that identifies the interactive communication session; encoding, at the server, the URL in a graphic pattern; and transmitting, from the server, the graphic pattern to a first client device. The operations may additionally include receiving, at the server, a transmission from a second client device. The transmission may be sent to the URL, and the transmission may include a representation of the user identification. The operations may further include determining whether the user identification is authentic using at least the representation of the user identification; and initiating, at the server, the subsequent step in the interactive communication session based at least in part on the identifier that identifies the interactive communication session in the URL and a determination that the user identification is authentic.

In some embodiments, a system may include one or more processors and one or more memory devices including instructions that, when executed by the one or more processors, cause the one or more processors to perform operations including determining, at a server, that a current step in the interactive communication session requires the user identification to be authenticated after initiating the current step in the interactive communication session and before initiating a subsequent step in the interactive communication session. The operations may also include generating, at the server, a Uniform Resource Locator (URL) that comprises an identifier that identifies the interactive communication session; encoding, at the server, the URL in a graphic pattern; and transmitting, from the server, the graphic pattern to a first client device. The operations may additionally include receiving, at the server, a transmission from a second client device. The transmission may be sent to the URL, and the transmission may include a representation of the user identification. The operations may further include determining whether the user identification is authentic using at least the representation of the user identification; and initiating, at the server, the subsequent step in the interactive communication session based at least in part on the identifier that identifies the interactive communication session in the URL and a determination that the user identification is authentic.

In any embodiments, one or more of the following features may be implemented in any combination and without limitation. The method/operations may also include transmitting a link to an application server from the server to the first client device. The application server may provide an application that is downloaded and executed on the second client device. The method/operations may also include receiving, at the server and from the first client device, a number for the second client device. The method/operations may also include sending a link to an application server to the second client device using the number for the second client device. The method/operations may also include causing the graphic pattern to be displayed on a screen on the first client device. The method/operations may also include causing instructions to be displayed on a screen on the first client device, wherein the instructions instruct a user to capture an image of the graphic pattern as displayed on the first client device using a camera of the second client device. The representation of the user identification may include front and back photographs of the user identification captured by a camera of the second client device. Determining that the user identification is authentic may include sending at least the representation of the user identification to a verification server. The transmission from the second client device further may include a facial image of a user associated with the user identification, where the facial image may be captured by the second client device after initiating the current step in the interactive communication session. Determining that the user identification is authentic may include a determination that the facial image of the user matches a photo on the user identification. The identifier that identifies the interactive communication session may include a package identifier that identifies a closing process associated with the user identification. The identifier that identifies the interactive communication session may include a user identifier and a device code. The graphic pattern may further encode a link to an application server where the second client device can download an application. The second client device may include a mobile phone with a camera. The user identification may include a photo identification. The laptop client device may include a desktop or laptop computer. The second client device may operate an application downloaded from an application server after initiating the current step in the interactive communication session.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 13 illustrates an example of the URL that can be decoded from the graphic pattern, according to some embodiments.

DETAILED DESCRIPTION

Described herein is a novel technology of user identification authentication. Before describing the novel technology of user identification authentication, this disclosure will discuss a cloud-based system coupled with an on-premises system, each of which can act as a requesting system for the resource verification server. The cloud-based system and the on-premises system described below are provided merely by way of example and are not meant to be limiting. However, they do provide examples of processes that may rely on resources and that may require verification of an operating resource protection policy available through a network. FIGS. 1-6 describe such processes that may operate on such requesting systems. FIGS. 7-21 then describe the technology of the user identification authentication.

Figure 1:
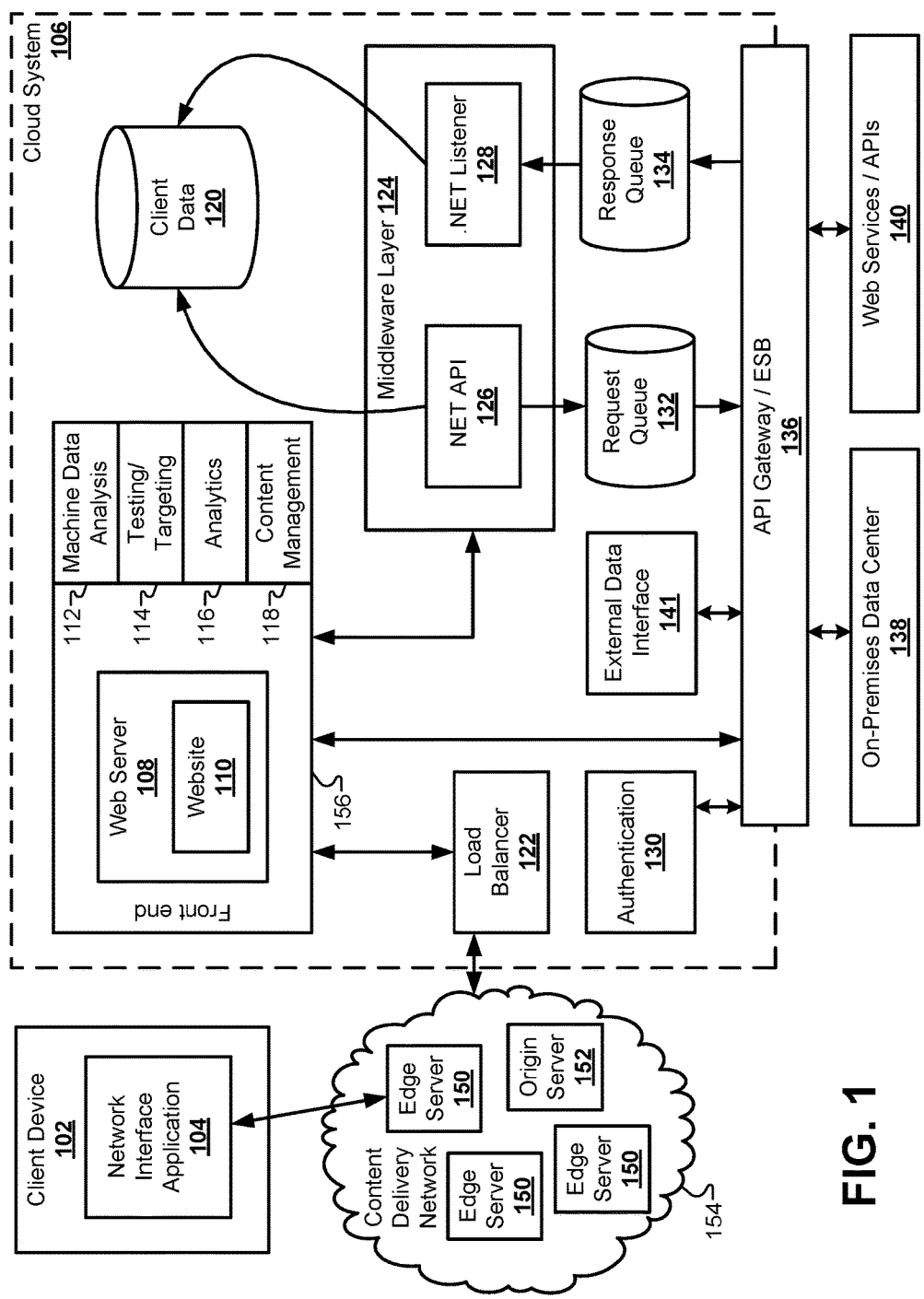
FIG. 1 illustrates a block diagram of a cloud system for receiving, importing, validating, and augmenting client data, according to some embodiments.

FIG. 1 illustrates a block diagram of a cloud system 106 for receiving, importing, validating, and augmenting client data, according to some embodiments. The client data collection process may begin with a client device 102 accessing the web server 108. The client device 102 may include a laptop computer, a desktop computer, a smart phone, a PDA, a tablet computer, a workstation, a voice-activated device or personal assistant, a watch, and/or the like. The client device 102 may be operated by a user to explore various data set options that may be available through the cloud system 106. The client device 102 may include a software application that acts as a network interface application 104 to parse and display data sent from the web server 108 and send information from the user. Depending on the particular hardware of the client device 102, the network interface application 104 may include a web browser operating on a desktop computer, an app operating on a smart phone, a voice recognition application operating on a control device, including the Google Home® or the Amazon Alexa®.

The client device 102 may communicate through a network, such as a local area network (LAN), a wide-area network (WAN), the Internet, and so forth. In the embodiment of FIG. 1, the cloud system 106 may provide content to the network interface application 104 via a content delivery network (CDN) 154. The CDN may include a plurality of edge servers 150 and at least one origin server 152 to store and distribute cached copies of the website 110 provided by the web server 108. The website 110 may include programming code, such as JavaScript, that provides front-end functionality to the website 110 when interacting with the client device 102. For example, the website 110 can collect client data that may be used to generate a result set by walking the user through a series of web forms. The client data may include information descriptive of the user, such as identification numbers. The website 110 can also use information supplied by the client device 102 to solicit information from third-party services through various APIs and/or web service interfaces. An example of a progression of web forms that collect information needed to recommend and/or approve a result set for the user is described in greater detail below. The client data may be provided in one or more data packets transmitted from the client device 102.

The CDN 154 can provide local copies of the website 110 to the client device 102 from an edge server 150 that is closer in proximity to the client device 102 than the web server 108 itself. One of the problems solved by the embodiments described herein involves the speed with which result sets can be provided and updated on the display of the client device 102. The architecture illustrated in FIG. 1 is specifically designed to increase the speed with which these results can be displayed on the client device 102 from a hardware perspective.

The website 110 is used only as an example of one of the ways that the cloud system 106 can interact with the client device 102. Therefore, this disclosure should not be limited to a website per se. Instead, the term website 110 throughout this disclosure may be replaced with any user interface capable of receiving data from the client device 102 and transmitting data to the client device. For example, another embodiment can provide a voice activated, audio interface for communicating with client devices through voice services such as Alexa® by Amazon®. Another embodiment can use an entertainment dashboard in a vehicle as an interface for communicating with the client device 102. Similarly, the web forms presented through the website 110 are also used as an example that is specific to the website 110 environment. In this disclosure, the term web form may be replaced with any sort of digital form that can present and receive information to a user through the network interface application 104. For example, the form could include interactive user interface elements displayed in an application running on a smart phone or smart watch. In another example, the form may include audio provided to a user and audio received from a user in a voice-activated user interface. Therefore, the terms "website" and "web form" are merely exemplary and not meant to be limiting.

The cloud system 106 may include a load balancer 122 that receives Internet traffic that may include client data provided from the client device 102. As used herein, the term "client data" may include any information received from the client device 102. For example, client data may include numerical values, data fields, estimates, identification numbers, addresses, user account identifiers, and so forth. As described in greater detail below, the client data received from the client device 102 may be augmented with information received from third-party web services and/or application programming interfaces (APIs). The client data may also be verified or validated using third-party validation interfaces that are external to the cloud system 106.

The cloud system 106 may include hardware elements that may be electrically coupled via a bus. The hardware elements may include one or more central processing units (CPUs), one or more input devices (e.g., a mouse, a keyboard, etc.), and one or more output devices (e.g., a display device, a printer, etc.). The cloud system 106 may also include one or more storage devices. By way of example, storage device(s) may be disk drives, optical storage devices, solid-state storage device such as a random access memory ("RAM") and/or a read-only memory ("ROM"), which can be programmable, flash-updateable and/or the like.

The cloud system may additionally include a computer-readable storage media reader, a communications system (e.g., a modem, a network card (wireless or wired), an infra-red communication device, etc.), and working memory, which may include RAM and ROM devices as described above. In some embodiments, the cloud system 106 may also include a processing acceleration unit, which can include a DSP, a special-purpose processor and/or the like.

The computer-readable storage media reader can further be connected to a computer-readable storage medium, together (and, optionally, in combination with storage device (s)) comprehensively representing remote, local, fixed, and/or removable storage devices plus storage media for temporarily and/or more permanently containing computer-readable information. The communications system may permit data to be exchanged with the network and/or any other computer described below with respect to the cloud system 106.

The cloud system 106 may also comprise software elements, shown as being currently located within a working memory, including an operating system and/or other code, such as an application program (which may be a client application, web browser, mid-tier application, RDBMS, etc.). It should be appreciated that alternate embodiments of a cloud system 106 may have numerous variations from that described above. For example, customized hardware might also be used and/or particular elements might be implemented in hardware, software (including portable software, such as applets), or both. Further, connection to other computing devices such as network input/output devices may be employed. Software of cloud system 106 may include code for implementing various embodiments as described herein.

The Web server 108 may be part of a front end 156 posted by the cloud system 106. The front end 156 may additionally include other hardware and/or software components that quantify the performance of the Web server 108. Some embodiments may include a content management system (CMS) 118 to support the creation and/or modification of digital content that is presented by the Web server 108 to the client device 102. Some embodiments may include an analytics component 116, such as a customer experience management (CEM) system that captures and analyzes the details of the experience of the user of the client device 102. Some embodiments may include a testing and targeting component 114 used to target specific users with specific content. Some embodiments may also include a machine data analysis component 112 that searches, monitors, and analyzes machine-generated big data via a web interface by capturing/indexing/correlating real-time data in a searchable repository to generate reports, graphs, and other visualizations. These components 112, 114, 116, 118 can be used by the cloud system 106 to analyze the effectiveness of the content provided by the website 110 over time.

The cloud system 106 may also include a middleware layer 124 that acts as an interface between the front end 156 and other data systems in the cloud system 106. The middleware layer 124 may perform application integration, data integration, and handle messages passed back and forth between the cloud system 106 and an on-premises data center 138 and other external systems. In the embodiment of FIG. 1, the middleware layer 124 may include an API 126 and a listener 128 for generating and receiving responses from various systems. For example, the middleware layer 124 can communicate with a client data database 120 that securely stores client data received from the client device 102. The client data database 120 can be used in conjunction with other off-cloud databases to store client data between web sessions for a particular user. The middleware layer 124 can also interface with a request queue 132 and a response queue 134 of the cloud system 106. The request queue 132 can store messages passed from the middleware layer 124 to other systems both inside and outside the cloud system 106. Similarly, the response queue 134 can receive messages passed from other systems to the middleware layer 124.

Some of the external systems that interface with the cloud system 106 may include the on-premises data center 138 and one or more Web services and/or APIs 140. To interface with these external systems, the cloud system 106 may include an API Gateway or Enterprise Service Bus (ESB) to provide a central point for managing, monitoring, and accessing exposed Web services. Data can be passed from the middleware layer 124 to the API Gateway/ESB 136 through the request queue 132 and/or the response queue 134. Additionally, the front end 156 may communicate directly with the API Gateway/ESB 136.

To collect the client data from the client device 102, the website 110 may present a series of dynamic web forms to the network interface application 104. Before, during, and/or after this process of collecting client data begins, the cloud system 106 may require the user to establish a user account with the cloud system 106. Some embodiments may include an authentication module 130 that authenticates an identity of a user of the client device 102. The authentication module 130 may communicate with the data center 138 through the API Gateway/ESB 136.

The presentation of web forms may include a type of web form that allows the client device 102 to submit data provided by the user. The web form can receive data from the user that may require some form of verification before it is used in the selection of a data set or the generation of a result set. Prior to this disclosure, such data verification could take days or even weeks to perform. This generally discouraged users from completing the web session and generating a client data packet. To solve this and other problems, the embodiments described herein may use an external data interface 141 to verify the client data provided from the client device 102. The external data interface 141 may, for example, retrieve a history of data values from other computer systems that can be used to generate an estimate of certain fields in the web form provided by the user. For example, the external data interface 141 may provide a verified value to the cloud system 106, and the data provided from the client device 102 may be verified if that data falls within a predetermined range of the verified value. This data verification step allows for greater accuracy and reliability when selecting candidate data sets and generating result sets for the client device 102.

The external data interface 141 may also retrieve data that can be used to supplement and/or correct information provided from the client device 102. Depending on the complexity of the web session, some users may be unwilling to manually enter all of the client data requested by the website 110. Other users may enter incorrect information accidentally or purposefully. The external data interface 141 provides an alternative to previous systems that required the user to manually provide all current data through the client device 102. Instead, the external data interface 141 can select at least a portion of the current data provided to the web form to automatically download a portion of the current data from the external data interface 141. For example, instead of manually typing current data values into the web form, the cloud system 106 can instead use a user identifier and/or user credentials to download a portion of the current data automatically through the external data interface 141. This process can decrease the amount of time required for the user to progress through the plurality of web forms, and can reduce user-injected errors into the client data. Information may be imported from the external data interface 141 as data packets. The external data interface 141 may access a third-party computer system that provides the imported data. After the client data is collected from the client device 102 and optionally supplemented/verified by data from the external data interface, the system can use the client data to generate a solution that includes one or more result sets.

Figure 2:
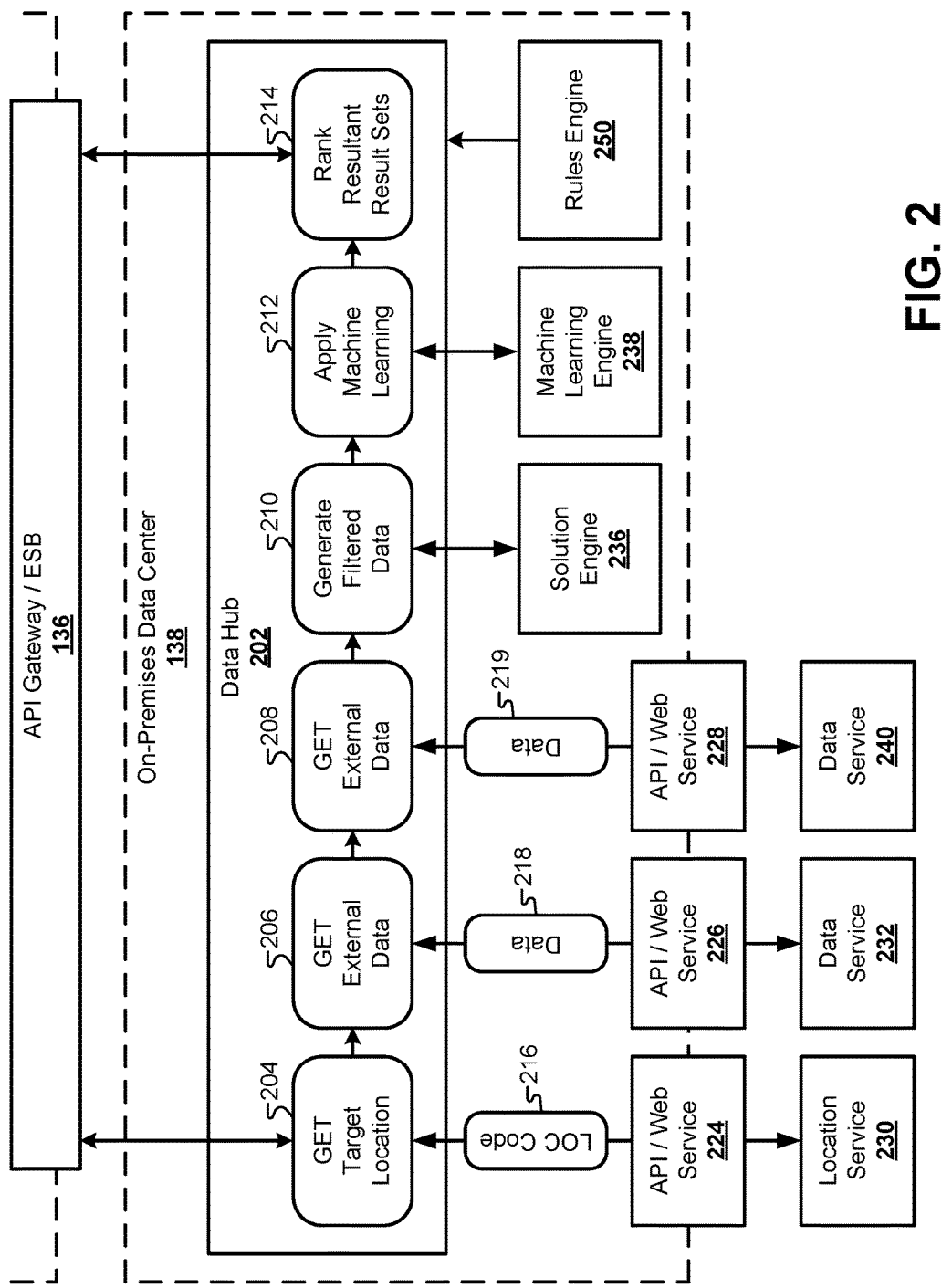
FIG. 2 illustrates a block diagram of a data center that may be used in conjunction with the cloud system, according to some embodiments.

FIG. 2 illustrates a block diagram of a data center 138 that may be used in conjunction with the cloud system 106, according to some embodiments. In this embodiment, the cloud system 106 may be separate from the data center 138. For example, the data center 138 may be physically hosted by an entity that generates the result sets to the client device 102, while the cloud system 106 may be hosted by a cloud service provider that is different from the entity providing the data center 138. However, in other embodiments, the functionality provided by the data center 138 may also be located in the cloud system 106. Some embodiments may duplicate the functions described below for the data center 138 in both the cloud system 106 and the data center 138. Therefore, the bifurcation of the system between FIG. 1 and FIG. 2A is done by way of example and not meant to be limiting. Other embodiments may divide the functionality described herein between the cloud system 106 and the data center 138 in any combination of functions without limitation. In another embodiment, the architecture of FIG. 2 may have the software/hardware components from the data center 138 instead located in the cloud system 106.

The data center may include various databases that store client data, along with systems that provide content for the cloud system 106. To generate solutions based on the received client data, the data center 138 may include a data hub 202 that receives a packet of client data from the cloud system 106 and generates one or more result sets that are transmitted back to the cloud system 106. The data hub 202 may act as a central accumulator of the client data that finalizes the client data packet for generating a solution. Specifically, the data hub 202 may be made up of a plurality of processes that augment, format, filter, and process the client data in such a way that a solution engine 236 and a machine learning engine 238 can generate an optimal result set.

In some embodiments, the data hub 202 can augment the client data by executing a process 204 that requests a location code 216 from a location service 230 through an API/web service 224. The location code may designate a general geographic area to be associated with the client data. The data hub 202 may also include a process 206 that uses the location code retrieved from the location service 230 to retrieve rules or penalties 218 that may be applied to the candidate data sets based on location. The process 206 can send the location code through an API/web service 226 to a data service 232 specifically configured to provide such rules or penalties 218 for candidate data sets. These may include a cost that is applied to the data set based on the location from the location service 230. In some embodiments, a process 208 may retrieve additional data 219 from a data service 240 through an API/web service 228. The data 219 received from the data service 240 may include a rating for the user that may influence which particular candidate data sets that may be available to the user. The data service 240 may include a third-party service that provides a rating for the user that is based at least in part in some of the values provided in the client data from the user, as well as a previous history of the user.

After augmenting the client data, the data hub 202 can include a process 210 to generate a set of filtered data. As used herein, the term filtered data may refer to a specific subset of the augmented client data that is formatted for submission to the solution engine 236. The filtered data can be used by the solution engine 236 to filter out candidate data sets from a collection of available data sets that are not available to the user. For example, at this stage, the client data may include an exhaustive list of information that may be needed later by the system in future web sessions. However, much of the client data may not be needed at this stage of the process for filtering the collection of available data sets. Therefore, the process 210 can select a subset of the information in the client data, format the filtered data accordingly, and send the formatted subset of the client data to the solution engine 236. In response, the solution engine can provide a plurality of candidate data sets from the collection of available data sets for consideration by the data hub 202.

Next, the data hub 202 can select one or more optimal data sets from the plurality of candidate data sets through a process 212 that accesses a machine learning engine 238. The machine learning engine 238 can use additional information from the filtered and/or client data. For example, the solution engine 236 may provide a plurality of data sets that are available to the user based on the filtered client data. The machine learning engine 238 can select an optimal subset of the available data sets to be transmitted back to the client device 102. A process 214 can then rank the result sets by type and send the result sets to the cloud system 106 for transmission to the client device 102.

The data hub 138 may govern the overall process of collecting the client data, determining which, if any, portions of the client data are missing or invalid, and calling upon external services to augment the client data with additional information. For each field in the client data, a rules engine 250 can execute a validation rule to ensure that the client data is valid (e.g., "is the value of the rate field greater than 0.00?"). The rules engine 250 can also determine which external data services may be used to retrieve data that is missing from the client data packet. For example, a rating from an external rating service may be required before candidate data sets can be selected. If the rules engine 250 determines that the client data set is missing this rating, it can cause the process flow of the data hub 202 to make a request to the external rating service to retrieve a rating for the user. Overall, the rules engine 250 can orchestrate the process flow of the different processes 204, 206, 208, 210, 212, 214, etc., in the data hub 202.

Figure 3:
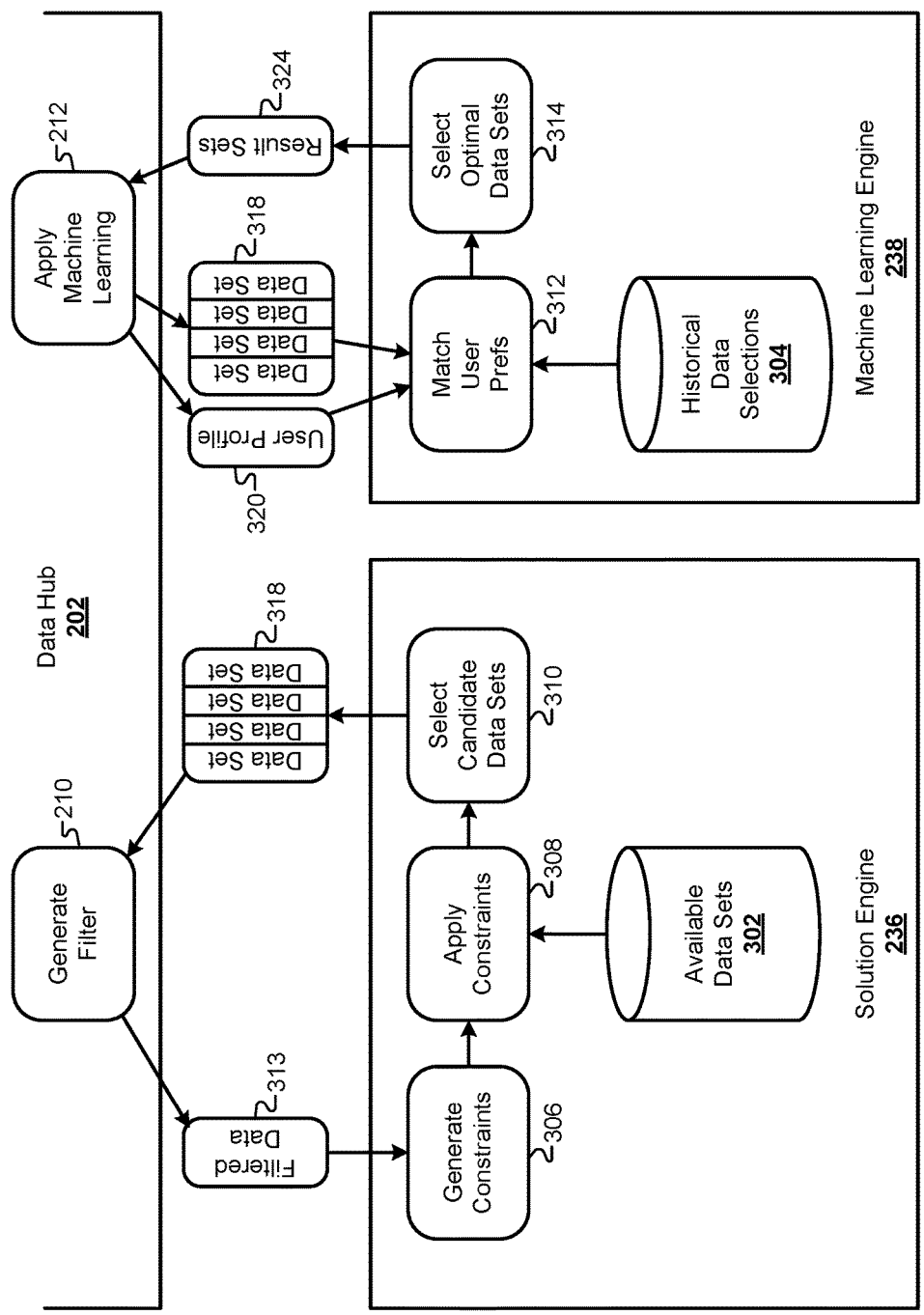
FIG. 3 illustrates a block diagram of how the solution engine and the machine learning engine generate result sets, according to some embodiments.

FIG. 3 illustrates a block diagram of how the solution engine 236 and the machine learning engine 238 generate result sets 324, according to some embodiments. The filtered data 313 can be passed to the solution engine 236, and process 306 can use the filtered data 313 to generate a plurality of rules and subsequent constraints to be applied to the available data sets. As described in greater detail below, the process 306 can use fields in the filtered data 313 to eliminate subsets of the available data sets, which can be expressed in constraints statements. For example, a determined data type may be used to eliminate certain data sets from the collection of available data sets. In some embodiments, the collection of available result sets may be categorized according to a type that may correspond to the data type in the filtered data 313. One or more constraint expressions may be constructed by the process 306 that would eliminate available data sets associated with that particular data type from the collection of available data sets for this particular set of filtered data 313.

After generating the constraints, the solution engine 236 can execute a process 308 that applies the constraint statements to the collection of available data sets. The collection of available data sets may be stored in a database 302, and may include thousands of different data set options. Data sets may be categorized based on a time interval, a rate, a source, and so forth. Data sets may also be categorized based on eligibility of the user based on augmented client data. In some embodiments, the constraint expressions can be applied in a single pass to each individual available data set; however, other embodiments may apply constraint expressions in multiple passes through the available data set. After the constraints are applied, a linear regression method 310 can be used to generate a set of candidate data sets 318. These candidate data sets may represent data sets for which the user may be eligible.

Next, the candidate data sets 318 can be provided to the machine learning engine 238. The machine learning engine can analyze the candidate data sets 318 and select one or more optimal data sets 314 from the candidate data sets 308. The machine learning engine 238 can use a collection of historical data selections 304 to determine the optimal data set(s) 314. For example, the client data provided by the user may be used to generate a user profile. The machine learning engine 238 can compare the user profile for this particular user to user profiles for previous web sessions associated with different users. The data set selections of previous users can then be used to determine which of the candidate data sets 318 would most likely be chosen by the current user.

For example, after each web session, the machine learning engine 238 can store the optimal data sets presented to each user, along with which of the optimal data sets was selected by each user in the collection of historical data selections 304. Additionally, the machine learning engine 238 can store the user profile derived from the augmented client data for each user with the selection information. When a new plurality of candidate data sets 318 is received for a new user, the augmented client data can be used to generate a similar user profile. For example, a set of values can be extracted from the augmented client data to generate a user profile 320. The user profile 320 can be matched to one or more historical user profiles. The final selections made by the users associated with the matched historical profiles can then be used to influence the selections made from the candidate data sets 318 for the current user. For example, if a number of previous users all selected certain types of optimal data sets that were presented, the previously selected optimal data sets can be ranked higher, based on this prior selection data. In essence, the machine learning engine 238 may use the expressed preferences of previous users to determine which of the candidate/optimal data sets are most likely to be selected by the current user.

Figure 4:
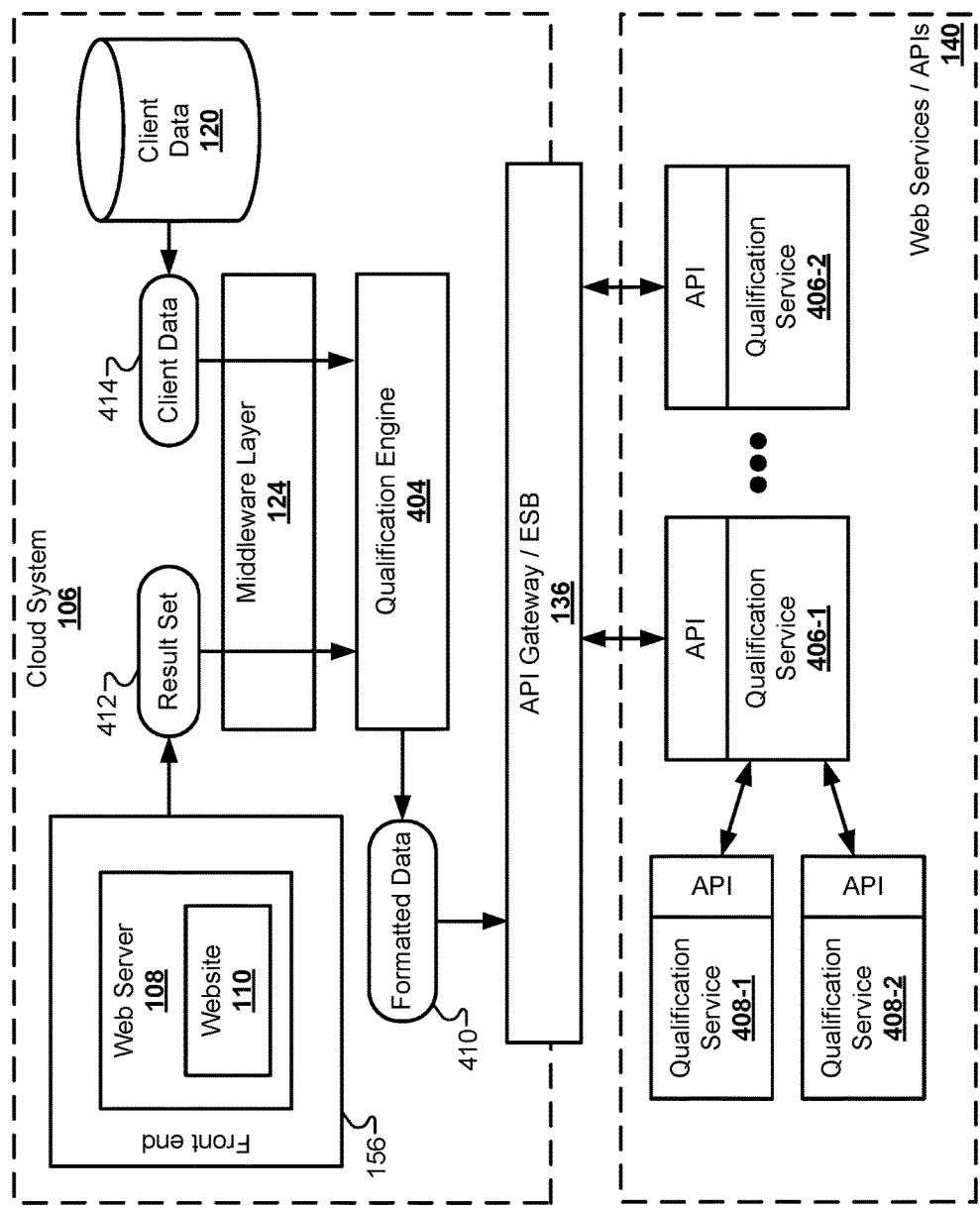
FIG. 4 illustrates a block diagram of the cloud system interacting with a plurality of qualification services, according to some embodiments.

FIG. 4 illustrates a block diagram of the cloud system 106 interacting with a plurality of qualification services 406, according to some embodiments. After the user has finalized the result set by adjusting values in the result set 324 through the web interface, the finalized result set 412 can be sent to a universal qualification engine 404 of the cloud system 106. The finalized result set 412 may include final values for the adjustable parameters that are set by the user, such as a final value for a rate field, a final value for a cost or penalty field, a final value for a time interval field, and so forth. Additionally, the client data that was collected, imported, augmented, and validated during the process described above may be stored in the client data database 120. The client data 414 may also be provided to the qualification engine 404.

After receiving the finalized rule set 412 and the client data 414, the qualification engine 404 can filter and/or combine data fields from the finalized result set 412 and the client data 414 to put together specific data packages that are required by each of the qualification services 406. Each qualification service 406 may require certain data points from the finalized result set 412 and/or the client data 414, and the qualification engine 404 can assemble data packages that match the requirements of each particular qualification service 406. Additionally, each qualification service 406 may require that each data packet be formatted according to specific requirements, such as a specific XML file format. The qualification engine 404 can format each data package according to the requirements of each particular qualification service 406.

Through the API Gateway/ESB 136, the qualification engine 404 can send data packages to one or more of a plurality of qualification services 406. Some qualification services 406 may be communicated with directly by the cloud system through a corresponding public API or web service interface. Secondary qualification services 408 may be accessible through another qualification service 406-1. In these cases, the data package can be formatted and selected based on the requirements of the qualification service 406-1, and a field or designator may be provided indicating that the qualification service 406-1 should send the request to a specific secondary qualification service, such as qualification service 408-2.

In some cases, each qualification service 406 may impose a penalty or cost on each submitted request. Therefore, it may be advantageous for the cloud system 106 to intelligently determine an order of precedence or ranking for the qualification services 406. When a plurality of qualification services are available, the cloud system 106 can rank each of the qualification services based on the criteria discussed below, then sequentially send requests to each of the qualification services 406 until an acceptable result has been returned. In some embodiments, the request may be sent simultaneously to each of the qualification services 406 without regard for a specific penalty for each. Instead, the system can analyze the results from each of the qualification services 406 to determine which of the results is most advantageous.

Figure 5:
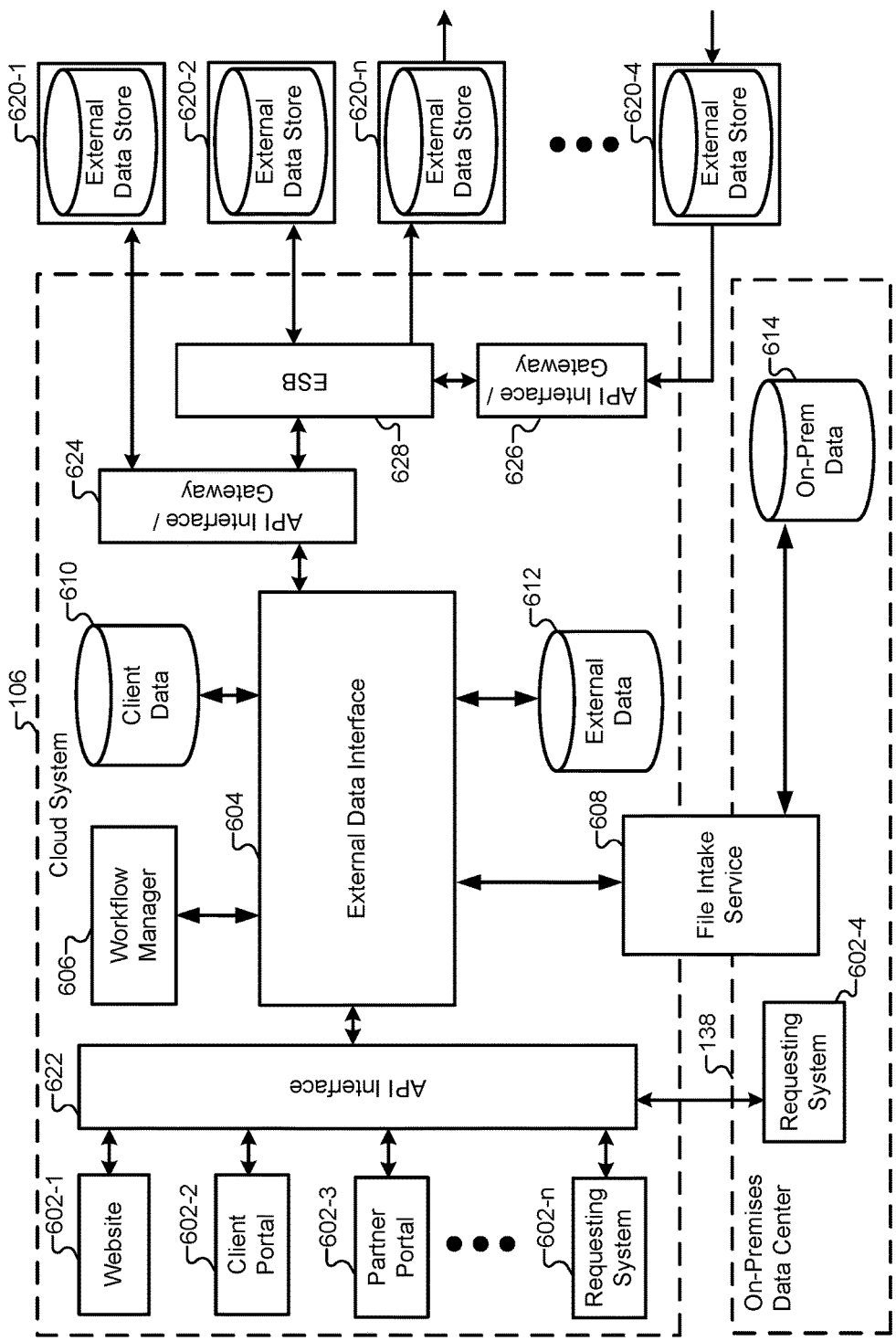
FIG. 5 illustrates an external data interface in the cloud system that can be used for extracting information from external data stores, according to some embodiments.

FIG. 5 illustrates an external data interface 604 in the cloud system 106 that can be used for extracting information from external data stores, according to some embodiments. As described above, the cloud system 106 may include a website 602-1. The website 602-1 can be used to initially collect information from the client device to begin the process described above. However, the website 602-1 may be just one of a plurality of possible requesting systems 602. These requesting systems 602 may include a client portal 602-2 allows client devices to access and edit their data sets after the process described above in FIGS. 1-4 to generate a final result set has been completed. The requesting systems 602 may also include a partner portal 602-3 that is a partner-facing web application used to feed client data to other systems. Some of the requesting systems 602 may be part of the same cloud system 106 as the external data interface 604. Alternatively or additionally, some of the requesting systems 602 may be part of the on-premises data center 138, such as requesting system 602-4. In other embodiments not explicitly shown in FIG. 5, some requesting systems 602 may also reside in other computing locations.

Together, the requesting systems 602 may be referred to herein as "internal" systems, in that they are internal to the cloud system 106 and/or the on-premises data center 138. This terminology can be used to differentiate the internal systems from the "external" data stores 620 that are being accessed. In some embodiments, the internal systems may all be operated by the same entity, whereas the external data stores 620 may each be operated by different entities. The internal systems also may be used for editing or collecting client device data from the client device for the process described above in FIGS. 1-4, whereas the external systems are used to supplement or verify information provided by the client device.

An API interface 622 may also be provided in the cloud system 106 to both identify and filter the requesting systems 602 (the internal systems) making requests, and to provide a uniform interface for each type of call that may be made to one of the external data stores 620. The API interface 622 can whitelist and/or blacklist any systems making a request. In some embodiments, each of the requesting systems 602 can be included on a whitelist such that no external systems can make calls through the API interface 622. In some embodiments, the API interface 622 can standardize the format for requests made to any external data store 620 using, for example, a REST interface. For example, POST or GET commands received through the API interface 622 can be used to extract data sets for single client identifiers, as well as batches of multiple data sets for multiple client identifiers.

In other embodiments, the API interface 622 may include a specified format for each subset of external data stores 620 that provide similar functions, provide similar services, and/or store similar data. For example, external data stores 620-1, 620-2 may each similarly provide a certain type of data that can be used to supplement client data in the same way. One function of the external data interface 604 and the API interface 622 is to abstract the details of selecting between all of the external data stores 620 to find the right subset of external data stores that can service the request from the client device, as well as selecting one of the subset of external data stores that can optimally service the request. Therefore, the API interface 622 may include standardized interfaces (e.g., POST/GET) for accessing similar types of data. When a command is received through the API interface 622, the external data interface 604 can determine the subset of external data stores 620 that are capable of servicing the request by virtue of the type of call received through the API interface 622. Each call that is specific to a subset of the external data stores may include parameters that are needed to access the corresponding subset of external data stores 620.

As will be described below in detail, the external data interface 604 can receive requests from the API interface 622 and proceed to check a localized cache for previous results, build a full request using stored client device data, select a single external data store from the identified subset of external data stores, and package the request in a format specific to the selected external data store. The cloud system 106 may include a client data store 610 that includes information received from the client devices, such as identification information that can be used to uniquely identify the user of the client device, and which can be used by the external data interface 604 to complete otherwise incomplete requests received through the API interface 622. The cloud system 106 may also include a database for external data 612 that has been previously extracted from the external data stores 620. The database for external data 612 can be used to service requests to the external data interface 604 without making an additional call to the external data stores 620 in certain situations described below.

After results are received from the external data stores 620, the external data interface 604 can store and analyze these data for future processes. A file intake service 608 may have portions that reside both in the cloud system 106 and in the on-premises data center 138. The file intake service 608 can receive data and documentation from the external data stores 620 and encrypt and transfer them to an on premises data store 614. The external data interface 604 can also perform certain evaluations to analyze the data received from the external data stores 620. In some cases, this analysis may verify information previously provided from the requesting systems 602 or augment the client data with information that has not yet been provided from the requesting systems 602. These evaluations may interface with a workflow manager 606 to both add and remove tasks specific to a particular client data set.

It will be appreciated that each of the external data stores 620 may include a web service interface or other standard API that includes formats or parameters that are very specific to each individual external data store 620. Therefore, before sending a request, the cloud system 106 may need to perform extensive formatting and repackaging of a request received through the API interface 622 before it is sent to the external data stores 620. One of the benefits provided by the system described herein is that the API interface 622 provides a standardized and stable interface for each of the requesting system 602 to make requests. As the web service interfaces of each of the external data stores 620 change over time, the external data interface 604 can be changed centrally to match the interfaces of the external data stores such that the requesting systems 602 are isolated from these changes. Put another way, the external data interface 604 and its surrounding APIs abstract the details of interfacing directly with the external data stores 620 from each of the requesting systems 602. Furthermore, when multiple external data stores 620 offer similar services, the external data interface 604 can abstract the process of determining which subset of the external data stores 620 are capable of servicing the request, as well as selecting one of the subset of external data stores 620 for servicing a particular request.

The process of formatting and packaging a request for the external data stores can be distributed between the external data interface 604, an API interface/gateway 624, and an Enterprise Service Bus (ESB) 628. The external data interface 604 may use a high-level programming language, such as C# or C++. Complex mappings between the data received from the API interface 622 and the required formats of the external data stores 620 can be performed in the external data interface 604, such as initially populating the request data fields and performing data transformations. Other lower-level mappings can be performed in the ESB 628, such as simple conversions between standardized formats (e.g., XML, and JSON). The ESB 628 can also provide a second layer of security by whitelisting/blacklisting systems such that only the external data interface 604 and other approved systems can make calls through the ESB 628 to the external data stores 620.

Another API interface/gateway 626 can be used for synchronous calls to external data stores 620. For example, each external data store 620 may have different session characteristics, including a session timeout interval. For some external data stores 620-4 that require a longer session (e.g., 90 seconds) to service requests, the API interface/gateway 626 can handle the timing and handshakes between the external data store 620-4 and the cloud system 106. For example, the external data store 620-4 may interface with another external system and act as a middleman between the external system and the cloud system 106. This may require a longer session interval while the external data store 620-4 interacts with the external system.

Figure 6:
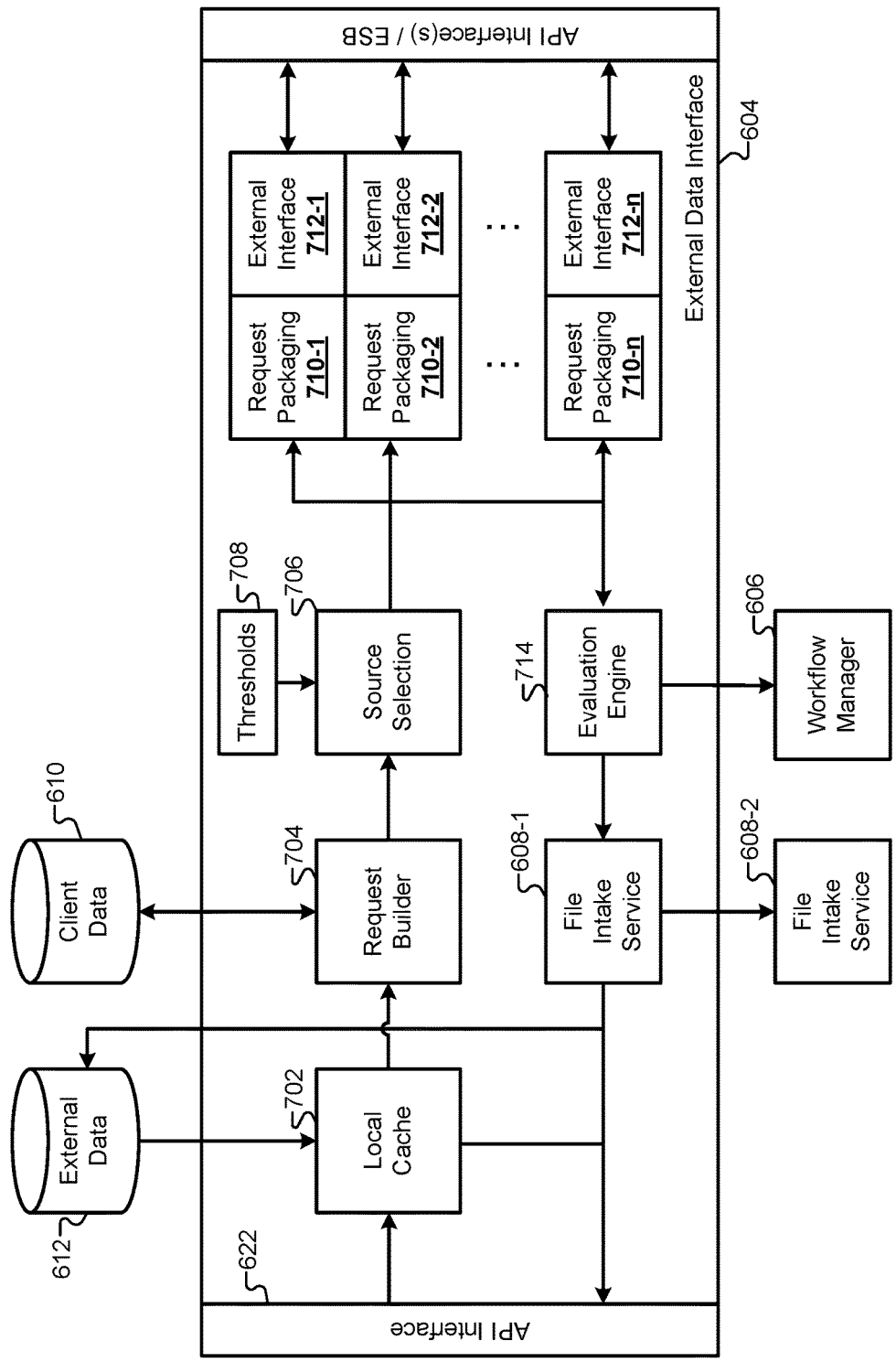
FIG. 6 illustrates a simplified block diagram of the external data interface, according to some embodiments.

FIG. 6 illustrates a simplified block diagram of the external data interface 604, according to some embodiments. After receiving the request through the API interface 622, the external data interface 604 can determine a type for the request. The type may be determined based on a particular call made through the API interface 622. For example, functions performed by the external data interface 604 may be associated with particular calls through the API interface 622. The external data interface 604 can receive a call and look up a subset of external data stores 620 that are capable of servicing the particular request type. Note that multiple calls may be made through the API interface 622 for the same subset of external data stores 620, such as both a GET and a POST call for a single functionality to service single and batch requests, respectively.

After receiving the request, and before accessing any of the external data stores 620, the external data interface 604 can execute a local cache function 702 that checks the database of external data 612 to determine whether the request can be serviced locally. The database of external data 612 can store data previously received from the plurality of external data stores 620. This can be useful for servicing duplicate requests where the resulting data sets have been recently retrieved from the plurality of external data stores 620.

If the local cache process 702 determines that a call needs to be made to the external data stores 620, the request can be forwarded to a request builder 704. The request builder can determine whether the information provided in the request is sufficient for the selected external data store to service the request. If additional information is needed, the request builder 704 can access the client data store 610 to retrieve information that has previously been provided by the client device. This allows the request made through the API interface 622 to be fairly simple, providing, for example, only a client identifier when the actual requests made to the external data stores require a more substantial set of client data to service the request.

A source selection process 706 can take the identified subset of the plurality of external data stores 620 that are capable of servicing a request type, and select a single external data store to service this particular request. A stored set of thresholds 708 that can be dynamically updated in real-time can be used by the source selection process 706 to balance the manner in which requests are funneled between the plurality of external data stores 620.

As described above, once a single external data store is selected, it may require very specific formatting according to its exposed web interface. For each of the plurality of external data stores 620, the external data interface may include a specific request packaging function 710 and external interface 712. The request packaging function 710 can perform the high-level repackaging of the request received from the request builder 704 to match the format and data fields required by the selected external data store. The external interface 712 can then handle the interaction between the external data interface 604 and the selected external data store. One advantage provided by this system is that when the public interfaces of the external data stores change, the only changes that need to be made to the cloud system 106 can be isolated to the request packaging functions 710 and the external interfaces 712. Therefore, these changes and external-system-specific details can be abstracted from the rest of the cloud system 106.

The external interfaces 712 can handle all of the interactions with the external data stores 620, including initiating a session, handling the communication protocol, enforcing security requirements, and monitoring the individual timeout intervals. Each of these functions may be very specific to the particular external interface 712. After receiving a resulting data set from the external data stores, the request packaging functions 710 can translate any results received into a common format for the cloud system 106. Again, this ensures a stable data interface for any requesting system while abstracting the specific formatting details of the external data stores 620. The request packaging functions 710 can generate a standardized response with a payload that may be specific to each subset of external data stores (or request type). Thus, any requesting system 602 making a particular function call through the API interface 622 can receive a standardized response regardless of which of the plurality of external data stores 620 actually services the request.

Before being forwarded to the requesting system, the formatted response can be evaluated by an evaluation engine 714. For example, the data received from the external data store may be used to verify fields provided from the client device. The evaluation engine 714 can compare fields received from the client device to corresponding fields in the formatted response to determine whether the fields received from the client device can be verified. Some embodiments may use stored thresholds or other metrics in that comparison. For example, if a value provided by the client device is within 5%, 10%, 50%, 20%, etc., of the corresponding value provided from the external data store, then the value in the field provided by the client device can be verified. In another example, a value provided from the external data stores 620 can be analyzed without requiring comparisons to data received from the client device. Some external data stores may provide a score or metric for a user of the client device. This score can then be compared to predetermined score thresholds to determine whether certain actions need to be taken by the user of the client device, or whether the user of the client device is eligible for certain workflow options. The evaluation engine 714 can use the evaluation results to interface with the workflow manager 606. For example, if values provided from the client device can be verified using corresponding values received from the external data stores, then certain tasks can be eliminated from a client workflow in the workflow manager 606. Conversely, if these values cannot be verified, then the evaluation engine 714 can add tasks to the workflow, such as requiring additional and/or manual verification of these values.

Some embodiments may include a file intake service 608. The file intake service may include a first component 608-1 that is resident in the external data interface 604 and/or the cloud system 106, as well as a second component 608-2 that is resident on the data center 138. Some external data stores may provide documentation that can be used later to document and/or prove the data received from the external data stores 620. These documents are generally not needed in the external data interface 604 to service future requests, but may be required to complete the process described above in FIGS. 1-4, an may require secure storage. Therefore, the first component 608-1 can transfer documents and/or data to the second component 608-2 in the data center 138 to be encrypted and securely stored. In some embodiments, the first component 608-1 can generate a message that is sent to the second component 608-2 indicating that new data and/or documents are available. The second component 608-2 can then pull documents and/or documents from the first component 608-1, perform any necessary document format conversion, encrypt the results, and store them securely in the on-premises data store 614. Note that the second component 608-2 can pull documents from the first component 608-1 using batch requests or at a later time after the request is serviced. The second component 608-2 can also subscribe to messages or events produced by the first component 608-1.

The data retrieved from the external data stores 620 can then be returned in a response having a standardized format for the request type through the API interface 622. In some embodiments, results of the evaluation engine 714 can also be included in the response. For example, some responses can include a flag or indication denoting whether the data provided by the client device was verified by the data provided from the external data stores 620.

User Identification Verification

In the example architecture described above, the cloud system and the on-premises data center execute numerous processes for granting access to a resource. These processes and other similar processes may include an interactive communication session between a client device and the server. For example, the server may present a series of progressive web forms to the client device, and the user may progressively provide more and more information as they navigate through the progression of web forms. At some point during the interactive communication session, it may become necessary to validate a user identification associated with the user. Multiple methods of validating a user identity are known in the art, but each of these known methods have possible disadvantages or can be readily spoofed.

For example, prior to this disclosure, users could provide usernames, passwords, code phrases, answers to personal questions, and other personal information that may be assumed to be known only to the user. By correctly providing this information to the server, the server can make a determination that the identity of the user behind the client device can be authenticated. However, this personal information can be intercepted, guessed, or otherwise compromised by a malicious user, and this personal information can then be used to spoof the authentication process at the server. In another example, users could provide biometric information that can be verified against stored values on the server and used to authenticate a user identity. While this method is harder to spoof, the drawback is the inconvenience and false negatives associated with authentication. Users concerned with privacy find it inconvenient and alarming to provide biometric information to perform routine tasks, such as unlocking an account, applying for an account, and other processes for which they feel the sharing of such intimate knowledge should not be necessary. Other examples may require secondary devices, such as hardware dongles or other forms of two-factor authentication. While these devices may provide stronger protection, they are also susceptible to theft, accidental loss, and damage. They also sacrificing user convenience by requiring the user to carry these devices with them when they want to verify their identity.

Each of these previous methods attempted to authenticate a user in a way that is as reliable and convenient as human-to-human identity verification can be. In a live context, identity authentication is easily performed by matching the look of a user's face with a printed identification card. By using identification cards that are issued by government entities, modern methods make it very difficult to generate false IDs that can be reliably passed off under scrutiny. Therefore, the simple action of showing someone an authentic user identification card is sufficient to authenticate a user identity in person in most situations. However, this type of live verification is difficult to achieve in real-time during an interactive communication session online.

The reliability of user authentication using printed identification cards that includes photos of the users has been found to be reliable to the extent that many regulations require a live verification of a user identification card to proceed to a next step of a process. For example, users with accounts that have been locked online may require an authentication of a user identification card prior to unlocking their account. Applications for various services and monetary transactions may require authentication of a user identification card in order to comply with government regulations. In each of these situations, the simple action of checking a user's driver's license is sufficient to allow a process to proceed.

However, despite the reliability of authenticating a user identification, there are significant technical challenges that prevent this from being a commonplace type of authentication that is used online. For example, one technical problem that exists is the ease with which photographic/video evidence can be prerecorded and replayed during an interactive communication session. For example, a user can take photos of their user identification and store them on a computing device. These photos could be compromised by a malicious attacker and presented to an online server to authenticate a stolen user identity. Modern video/photo editing techniques allow such authentication methods over traditional video/audio connections to be easily manipulated to match virtually any photographic appearance. At the time of this disclosure, online services have been made available that can transpose a user's face onto an animation of another character with startling realism.

This technical problem with user identification authentication is related to other technical problems associated with the interactive communication session itself. When users are required to authenticate a user identification during an online session, and such authentication requires an in-person visit or other process that cannot be performed in an immediate fashion online, users tend to abort and discontinue the interactive online session rather than continue. This results in communication sessions that are started but not finished, which requires state information to be stored on the server and uses excessive memory unnecessarily. This also causes many communication sessions to be restarted again from the beginning, which increases the total number of communication sessions that have to be handled by the server, which in turn minimizes throughput and increases the bandwidth usage of the server.

The embodiments described herein solve these and other technical problems by enabling a live, real-time verification of a user identification during the interactive communication session. This has been shown to reduce the number of communication sessions that are aborted prematurely, which reduces the memory used to store communication session states, increases the throughput of successful communication sessions, and frees up bandwidth on the server that can be used for other purposes. These technical problems are solved by using a first client device and a second client device. The second client device can be used to capture a representation of the user identification and transmit the representation to the server. A graphic pattern provided from the server can be used by the client devices to link the representations to the ongoing interactive communication session. By enabling the capture, transmission, and authentication of the user identification, the functioning of the computer system itself is improved by completing more communication sessions, reducing memory usage, increasing bandwidth, and increasing throughput.

Additionally, some embodiments solve the technical problems inherent with trying to validate a photo ID online. For example, some embodiments provide a dedicated application to the second client device that can ensure that photos and videos are captured in real time through an actual camera. This prevents malicious actors from simply uploading prerecorded videos and/or images of stolen identification cards. The graphic pattern provided from the server links the security of the application to the interactive communication session, which allows the session to rely on the representation of the user identification captured by the camera of the second client device to make an authentication determination.

Figure 7:
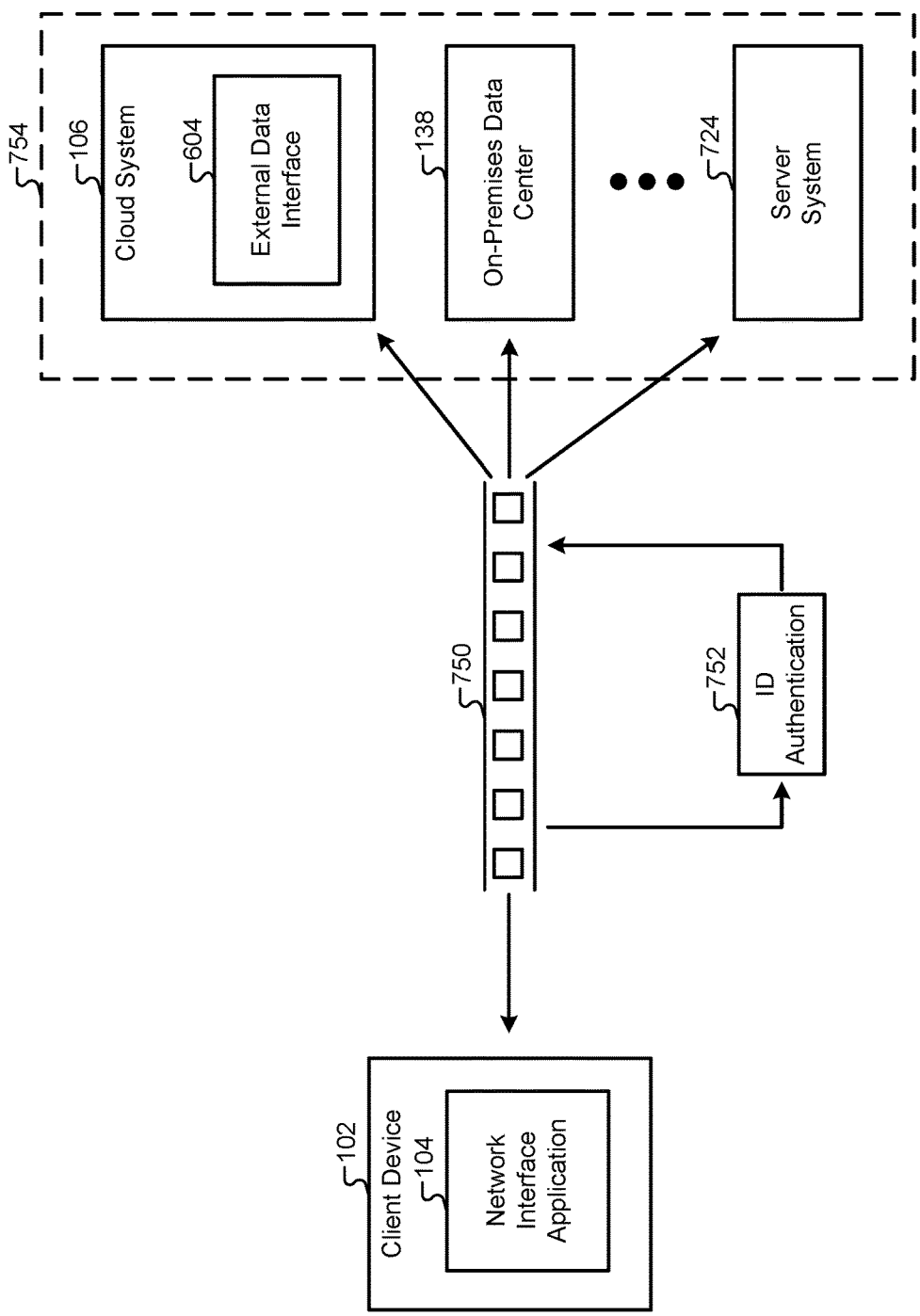
FIG. 7 illustrates a communication diagram illustrating an interactive communication session where user identification authentication may be used, according to some embodiments.

FIG. 7 illustrates a communication diagram illustrating an interactive communication session where user identification authentication may be used, according to some embodiments. The interactive communication session 750 may be carried out between a client device 102 and one or more servers 754. The client device 102 may include computer workstations, desktop computers, laptop computers, notebook computers, tablet computers, smart phones, smart watches, and/or other computing devices. Using the example from the disclosure above, the servers 754 may include a cloud system 106, an on-premises data center 138, and/or other server-based systems 724. Throughout the remainder of this disclosure, the server systems may be referred to simply as "a server," which may be interpreted to refer to one or more servers, including those servers 754 depicted in FIG. 7. Similarly, the "client device" 102 may refer to one or more client devices that may be used in combination to communicate with the server 754 through the interactive communication session 750.

An interactive communication session 750 may take place in a single online session within a defined time period, or alternatively may be spread out over a number of discrete time intervals and utilize a number of different devices. For example, an interactive communication session 750 may begin on a user's laptop computer, transition to a user's smart phone, then transition back to a user's laptop all as part of the same interactive session. Some sessions may pause and be restarted at a later time. During some of the embodiments described herein, the interactive communication session may be restricted to a continuous communication session that is completed in a single session and not continued at a later time, but rather is completed in a single defined time period, such as within 10, 15, 35, 30, 40, or 50 minutes.

The interactive computer session 750 may include a plurality of web forms or webpages that are progressively presented to the client device 102. These web forms or webpages may be presented on a network interface application 104, such as a web browser or an application that downloads information from the server 754 for display on the client device 102. These web forms or webpages may incrementally receive information from the user. For example, they may present questions to the user, present fields that can be populated by the user, present information to the user, provide methods for the user to provide a digital signature, and/or other interactive forms of input/output.

In some embodiments, the presentation of web forms may be broken up into a series of steps in a process. For example, the presentation of each web form may be the initiation of a current step in a process. Alternatively or additionally, steps in the process may represent steps in a workflow. For example, the workflow may define steps that request or validate information from the user. In some cases, steps in the workflow may correspond to web forms are presented in one-to-one, many-to-one, and/or one-to-many relationships. For example, a single step in a workflow process may correspond to a plurality of web forms to collect information to satisfy requirements of progressing past that step. In another example, a single web form may collect information that can be used to progress through a plurality of steps in the workflow.

During the interactive communication session, a current step may be initiated that requires the authentication of user identification. As described above, it may be necessary to carry out this authentication requirement during the interactive communication session. For example, it may be required that the authentication process begin after the current step is initiated and end before a subsequent step is initiated. Thus, a current step of the process can initiate an authentication process 752 that may need to be completed before the subsequent step can be initiated. For example, a web form may be presented to a user with steps for completing the user identification authentication process 752. The client device 102 may be prevented from navigating to a subsequent webpage representing a subsequent step until the authentication process 752 is completed. In some embodiments, this may be described as pausing the interactive communication session 750 until the authentication process 752 is completed successfully.

Figure 8A:
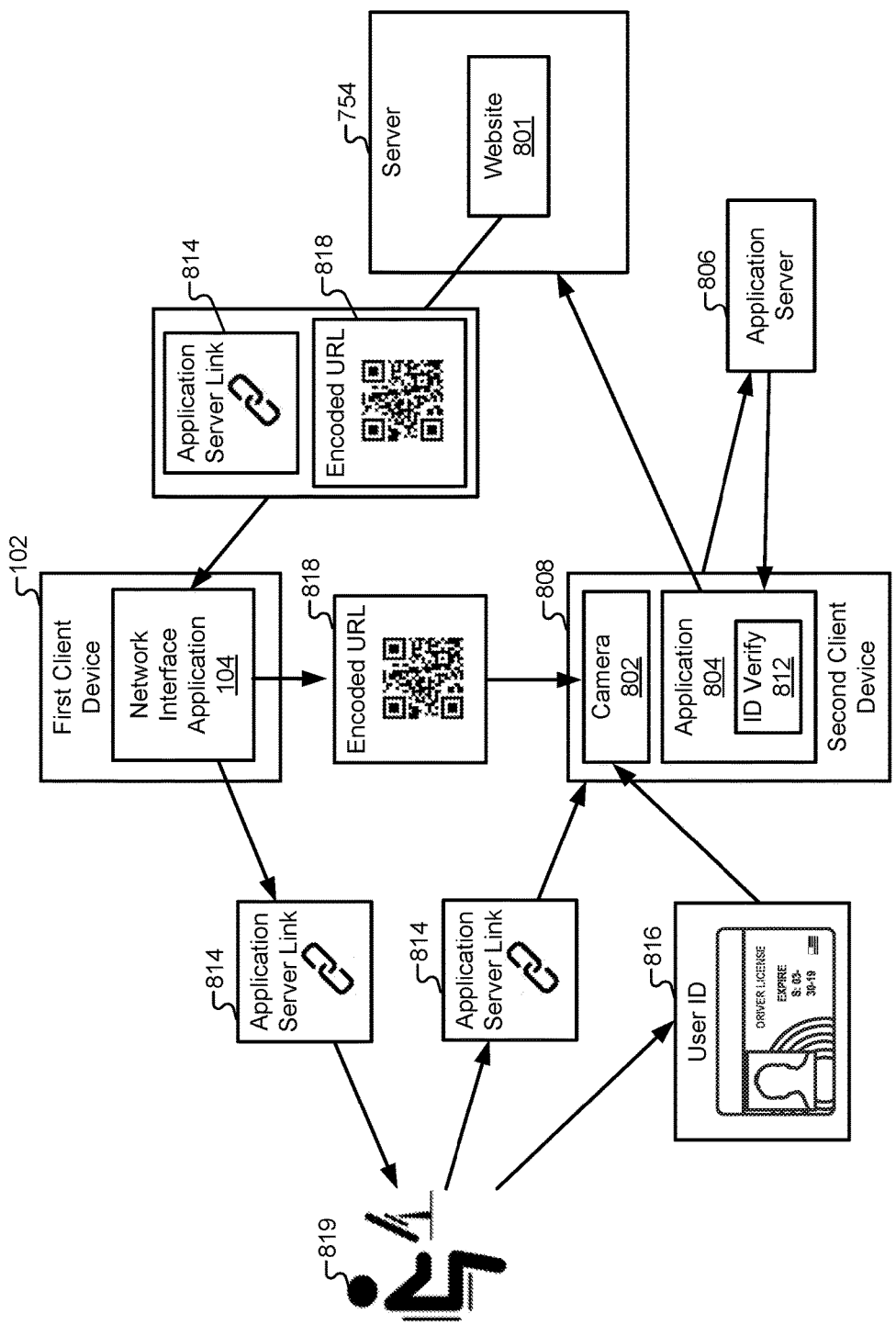
FIG. 8A illustrates a diagram for authenticating a user identification, according to some embodiments.

FIG. 8A illustrates a diagram for authenticating a user identification, according to some embodiments. In this illustration, the process may begin at the server 754, which may collectively referred to a plurality of servers that operate to present the interactive communication session to client devices as described above. The server 754 may present a website 801 to a first client device 102 operated by a user 819. The website 801 may be displayed on a network application interface 104 of the first client device 102, such as a web browser operating on a desktop/laptop computer. The website 801 may present a plurality of web forms that are representative or associated with an underlying multi-step process. It may be determined at a current step in the process that an authentication of the user identification is required.

To begin the authentication process, the server 754 can begin enabling an environment that guarantees that the identification authentication takes place in a live, real-time environment. To control the process of capturing a representation of the user identification, the server 754 may provide a special application 804 that can run on a second client device 808. The application 804 can ensure that live images are captured of the user identification, and that such capture takes place during the interactive communication session as may be required by law or regulation. In order for the second client device 808 to download and execute the application 804, the server 754 can generate an application server link 814 and transmit the application server link 814 to the first client device 102. The application server link 814 can be displayed on a display device of the first client device 102 through the network application interface 104. For example, a browser displayed on the screen of a laptop computer can display a URL for the application server. As the application server link 814 is displayed, it may be visible to the user 819 on the display. The user can then enter the application server link 814 into the second client device 808. In some embodiments, the second client device 808 may include a smart phone or tablet computer that is equipped with a camera 802. The application server link 814 may include a link to a server location where the application 804 may be downloaded. For example, the application server link 814 may include a server address of an application server 806, such as an "app store" that allows users to download "apps" that can run on the second client device 808. The application server link 814 may identify the application server 806, and may also identify the particular application 804 such that the user 819 only needs to enter the application server link 814 to be taken to a page on the application server 806 to download the application 804. The application 804 may include a process 812 that is used to capture, authenticate, and/or transmit representations of the user identification.

At this point, the first client device 102 may still be engaged in the interactive communication session with the server 754. Although the application 804 is executable on the second client device 808, the second client device 808 may not yet be connected to the interactive communication session. In order to link information captured by the application 804 to the interactive communication session at the server 754, the server 754 can generate a graphic pattern 818 that encodes a Uniform Resource Locator (URL) that can be transmitted to the first client device 102. The graphic pattern 818 may encode an identifier that identifies the interactive communication session. For example, the graphic pattern 818 may include a session ID, a user ID, a device ID, and/or other identifiers that can be used to identify the session, user, device, or process that is being executed. Some embodiments may include a "package ID" that identifies a package of documents that are being formalized, collected, and/or executed for the user 819. This information may be encoded into the URL as described below, and the URL itself may be encoded into the graphic pattern 818. The graphic pattern 818 may include a Quick Response (QR) code, a barcode, a string of letters/numbers, or any other visual representation of the encoded URL.

After generating the graphic pattern 818, it can be transmitted to the first client device 102 and displayed thereon. The graphic pattern 818 can then be transferred to the second client device 808 through the camera 802. For example, instructions can be provided by the server 754 and caused to be displayed on the first client device 102 that instruct the user to capture an image of the graphic pattern 818 using the camera 802 of the second client device 808. When the user executes the application 804 of the second client device 808, the application 804 may also automatically display instructions to the user instructing them to capture an image of the graphic pattern 818. The application 804 may automatically request access to the camera 802, and display an image on the screen that is captured through the camera 802 in real time. The user can then point the camera 802 of the second client device 808 at the image of the graphic pattern 818 displayed on the first client device 102 and capture a picture of the image. The application 804 can then decode the URL from the graphic pattern 818 and use the URL to send transmissions to the server 754 that can be used to link information received by the application 804 to the interactive communication session between the server 754 and the first client device 102.

The application 804 can also instruct the user to capture a representation of the user identification 816 for authentication. In a manner similar to how the graphic pattern 818 was captured as described above, the application 804 can display instructions and a live video feed from the camera 808 instructing the user to place the user identification 816 in the view of the camera 802. The user identification may be a photograph, a membership card, a credit card, a personal check, a business card, or any other identifying information. In some embodiments, the user identification 816 may include a government-issued identification such as a driver's license, a passport, a military ID, a voter registration card, and/or other forms of photo identification. In some embodiments, the application 804 can instruct the user to capture a front and back image of the user identification 816. These images may serve as representations of the user identification 816 for authentication purposes. In other embodiments, the representation of the user identification 816 may include encoded information, compressed images, visual signatures extracted from the images, results of numerical algorithms executed on the images, locations and/or characterizations of visual features of the images, and/or the like.

In some embodiments, the application 804 can perform a preliminary check to ensure that the representation of the user identification 816 is sufficient to determine authenticity. For example, the application 804 can visually detect a type of identification, such as a driver's license or passport. The application 804 can also determine whether text in the representation is recognizable (e.g., it is able to perform an OCR process), whether watermarks are in the expected location, whether lines in a photograph are clear such that facial features can be identified, and so forth. If the representation of the identification 816 fails this initial check, the application 804 can instruct the user 819 to capture new representations of the user identification 816.

In some embodiments, the application 804 may also instruct the user 819 to capture an image of their face using the camera 802. For example, the application 804 may ask the user to "take a selfie." This facial image can also be sent to the server 754 in conjunction with the representation of the user identification 816 to authenticate the user identification 816 and/or the identity of the user.

After capturing or generating a representation of the user identification 816, the application 804 can transmit the representation of the user identification 816 to the server 754. If an image of the face of the user 819 was also captured, this can be transmitted to the server 754 as well. After receiving the transmission(s), the server 754 can examine the URL and extract the identifying information from the URL. For example, the server 754 can extract identifiers for the user, the interactive session, the package, the device, and so forth, and use the identifier(s) to link the received information to the interactive session between server 754 and the first client device 102.

A determination can then be made as to whether the user identification is authentic. If the user authentication is determined to be authentic, the server 754 can then initiate a subsequent step in the interactive communication session. This decision to initiate the subsequent step can be made based at least in part on using the URL to identify the correct interactive session and process, as well as the determination that the identification was authenticated. For example, after authenticating the user identification 816, the website 801 can display a subsequent web form, generate an approval for a process, unlock an account, and so forth. If the authentication step is not successful (e.g., the user identification cannot be authenticated), then the subsequent step initiated by the server 754 may be different from a subsequent step that would be initiated upon successful authentication. For example, the server 754 can abort the process, initiate an alternative method for authenticating the user identification, provide explanation to the user describing the failure, or offer the user additional options.

Some embodiments may also allow for a single scan process to cover multiple users, or to allow multiple users to each go through the ID verification process individually during the same active session. For example, a single identification can be verified to move to the subsequent step in the interactive communication session, even when the underlying process or session involves multiple users. In other words, a single identification can be authenticated to move the process forward for a number of different users. Additionally, if multiple users are associated with the underlying process of the interactive communication session, the session can sequentially scan and/or verify user identifications for each associated user. For example, a husband, a wife, a co-borrower, etc., can be sequentially asked by the application 804 to scan their user identifications, and the authentication determination can be provided to the server 754 for each user.

Figure 8B:
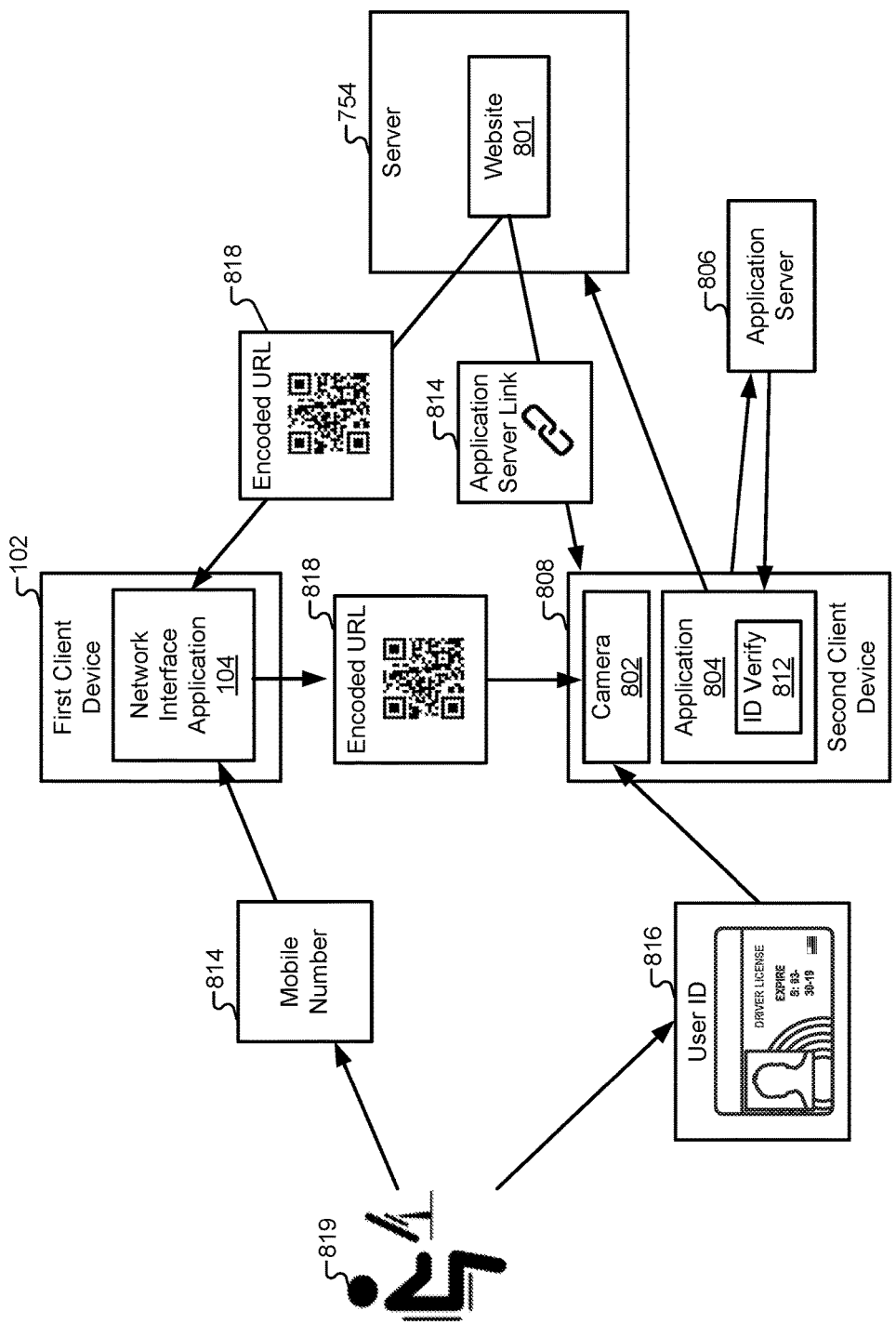
FIG. 8B illustrates an alternative process for authenticating a user identification, according to some embodiments.

FIG. 8B illustrates an alternative process for authenticating a user identification, according to some embodiments. This process is identical to the process illustrated above in FIG. 8A, the difference being the method in which the application 804 is provided to the second client device 808. Instead of sending the application server link 814 to the first client device 102 and requiring the user 819 to enter the application server link 814 into the second client device 808, these embodiments may use a more streamlined process. Specifically, the server 754 can cause instructions to be displayed on the first client device 102 that instruct the user 819 to provide an identifier 814 for the second client device 808. The user 819 can type the identifier 814 into the first client device 102, and the first client device can send the identifier 814 to the server 754. The server can then use the identifier 814 for the second client device 808 to send the application server link 814 directly to the second client device 808. For example, the identifier 814 may include a mobile telephone number when the second client device 808 includes a smart phone. The server 754 can then text the application server link 814 to the smart phone, where the user 819 can select the application server link 814 and be taken automatically to a page in an "app store" at the application server 806 to download the application 804. In other embodiments, the identifier 814 may include an email address, an IP address, and/or any other identifier that can be used to send information from the server 754 to the second client device 808. The information sent to the second client device 808 may include the application server link 814 such that the user 819 can simply click the link rather than manually typing information into the second client device 808 that was displayed on the first client device 102.

A second variation is also made possible by the architecture of FIG. 8B. Instead of sending the application server link 814 to the second client device 808 by way of text message, email, or other dedicated communication, the application server link 814 can be encoded in the graphic patterning 818 along with the encoded URL. When the second client device 808 reads the graphic patterning 818 from the screen of the first client device 102, the graphic pattern 818 can be decoded to recover both the encoded URL and the application server link 814. The application server link 814 can then automatically direct the second client device 808 to the application server 806 to download the application 804.

Figure 8C:
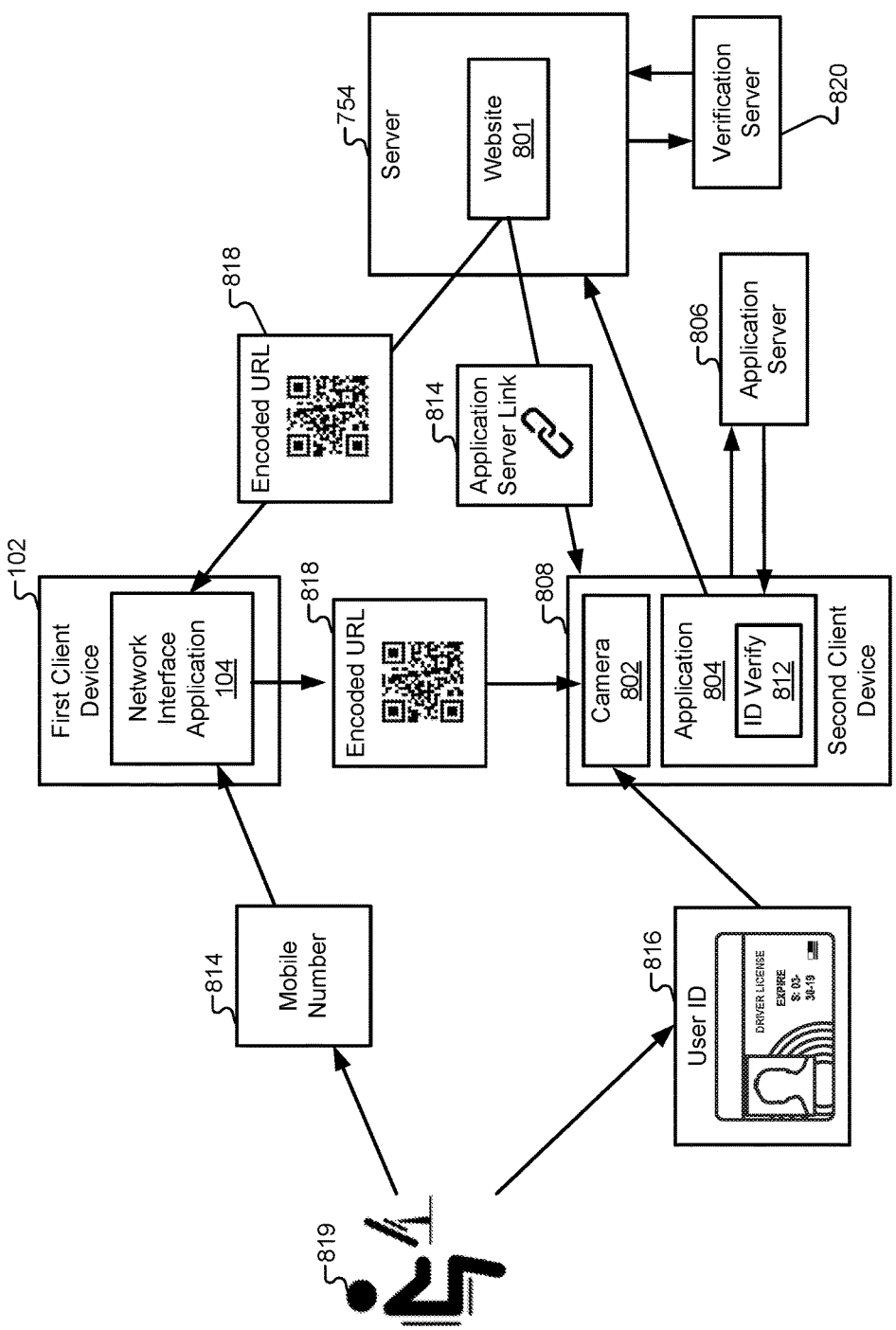
FIG. 8C illustrates an alternative process for authenticating a user identification, according to some embodiments.

FIG. 8C illustrates an alternative process for authenticating a user identification, according to some embodiments. This process is identical to the process illustrated above in FIG. 8B, the difference being the method in which the determination is made as to whether the user identification is authentic. In some embodiments, the server 754 may perform the authentication process itself. This may be done by identifying visual characteristics of the user identification 816 that can be used to prove authenticity. For example, the authentication process may determine a type of the user identification 816, such as a state driver's license, a passport, etc. The server 754 may then access a database of requirements that can be used to authenticate that type of user identification 816. For example, the representation of the user identification 816 can be analyzed to determine that graphics are located in the correct location, that watermarks are located in an expected form and location, that identification numbers are correct, and that any other information meets the visual requirements of the user identification type. Some embodiments may also query third-party servers and send identification numbers extracted from the representation of the user identification to ensure that the identification is valid. For example, a driver's license number can be sent to a public API that accesses a motor vehicle database to ensure that the license is authentic and valid.

In the embodiment of FIG. 8C, a separate verification server 820 may be used. The verification server 820 may be separate from the server 754. In some embodiments, the verification server 820 may be operated by a different entity from the entity that operates the server 754. For example, the verification server 820 may be a commercial service with an API that accepts representations of the user identification 816 in returns a determination as to whether the user identification 816 is authentic and valid. In some embodiments, the application 804 can communicate directly with the verification server 820 and then send the verification determination to the server 754. In some embodiments, the verification server 820 may have a white list of servers from which it will accept requests, which would likely prevent the application 804 from communicating with the verification server 820 directly. Therefore, the server 754 can be added to the white list of the verification server 820, and requests from any applications 804 on second client devices 808 can be transmitted through the server 754 to the verification server 820. Therefore, determining that the user identification is authentic using the representation of the user identification may include sending the representation of the user identification to a separate server, such as the verification server 820, and receiving an authentication decision from the verification server 820. Some embodiments may pass the representation of the user identification to the verification server 820 without storing the representation of the user identification on the server 754 itself. Instead, this information may simply pass through to the verification server 820, and the server 754 does not have to implement the overhead of securely storing user data of this kind.

Figure 9A:
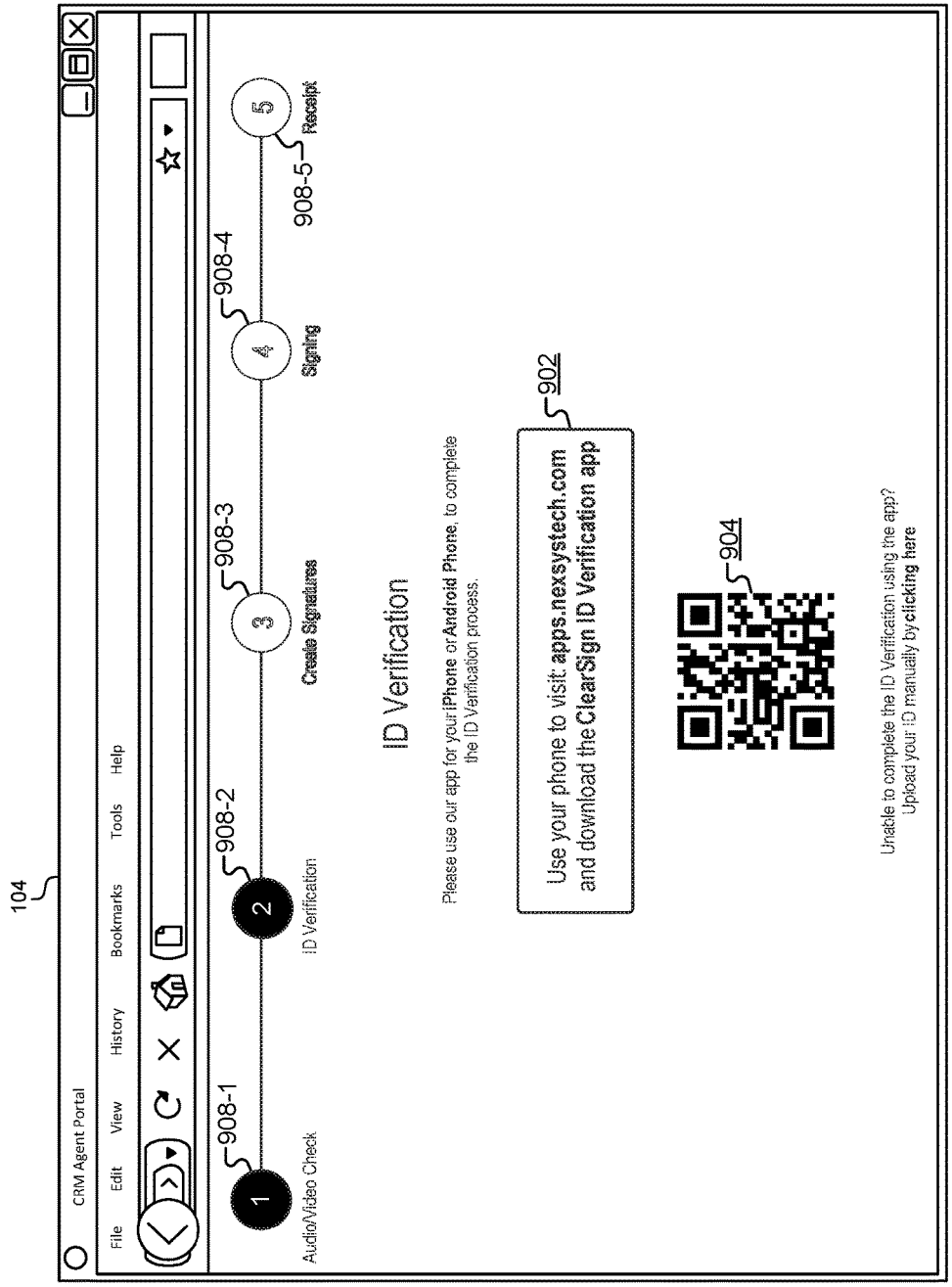
FIG. 9A illustrates the network interface application operating on the first client device, according to some embodiments.

After describing the general process for authenticating a user identification, the following figures walk through an example of how this process may be experienced using the first client device and the second client device described above. FIG. 9A illustrates the network interface application operating on the first client device (e.g., a web browser operating on a laptop computer). A webpage may illustrate different steps 908 in a process of the interactive communication session. The user may have completed step 908-1. However, after initiating step 908-2, a determination has been made that a user identification should be authenticated before continuing. Specifically, this authentication should be completed prior to initiating step 908-3.

In this example, the webpage may present information to the user describing how to complete the user identification authentication process. Specifically, the user may be informed that they will need a second client device, such as a mobile phone to complete the process. As described above in relation to FIG. 8A, the webpage can display the application server link 902 on the display. The user can then enter this link manually into the second client device to download the application. After downloading the application, the webpage may also display the graphic pattern 904 that can be read by the second client device using the downloaded application. In this embodiment, the graphic pattern 904 may be implemented using a QR code. However, the QR code is used merely by way of example and is not meant to be limiting. Any other graphic pattern may be used, including alphanumeric strings, barcodes, and/or the like.

Figure 9B:
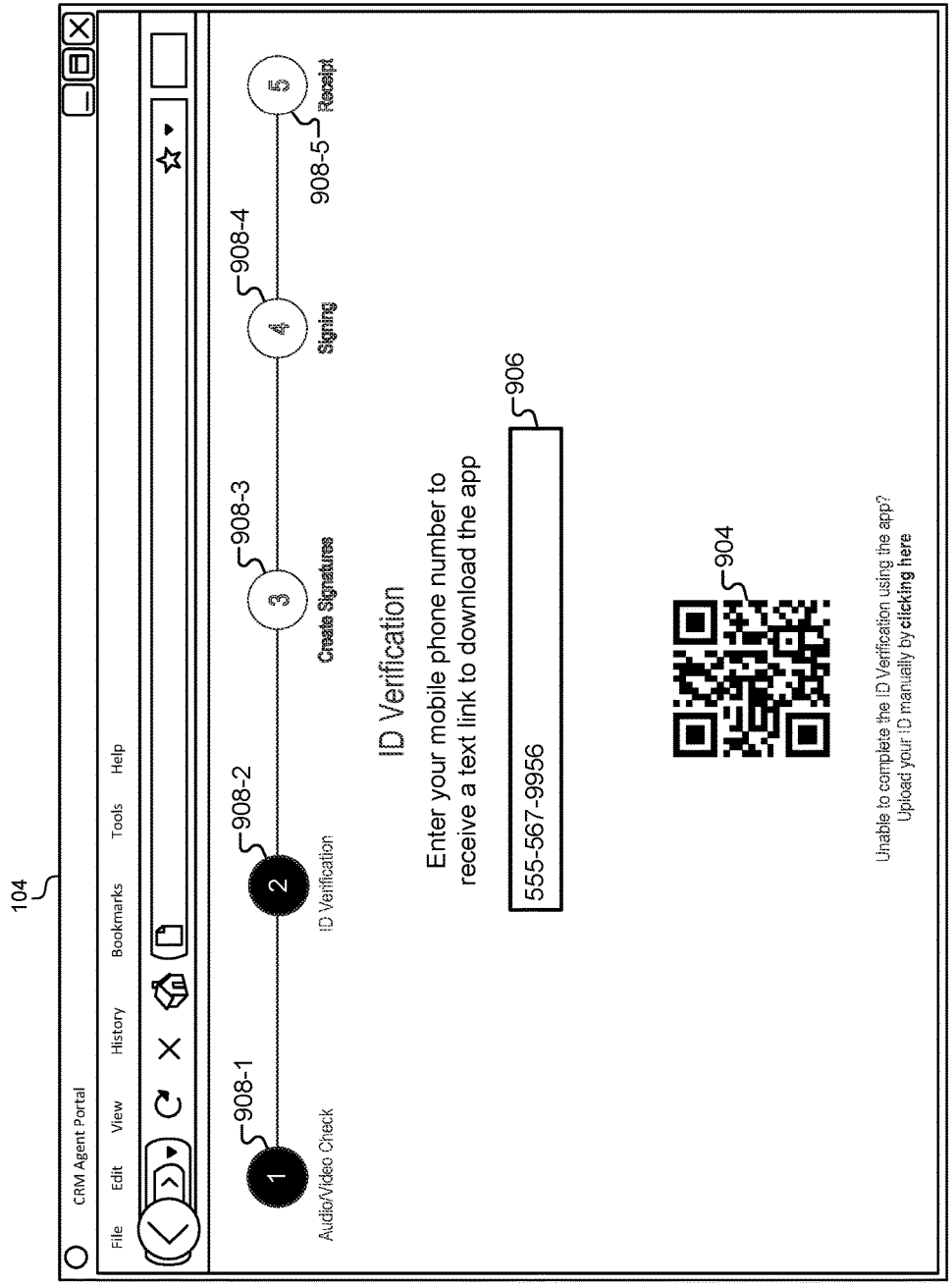
FIG. 9B illustrates an alternative webpage presented through the network interface application, according to some embodiments.

FIG. 9B illustrates an alternative webpage presented through the network interface application, according to some embodiments. In this example, instead of presenting the application server link 902 in the browser, the browser may instead provide instructions to enter an identifier for the second client device into a text field 906 of the webpage. For example, instructions may be provided to enter a mobile number for a smart phone to receive a text link to download the application. After entering the identifier, the server can automatically send the application server link 902 to the second client device in a text message, email, instant message, and/or other communication channel.

Figure 10:
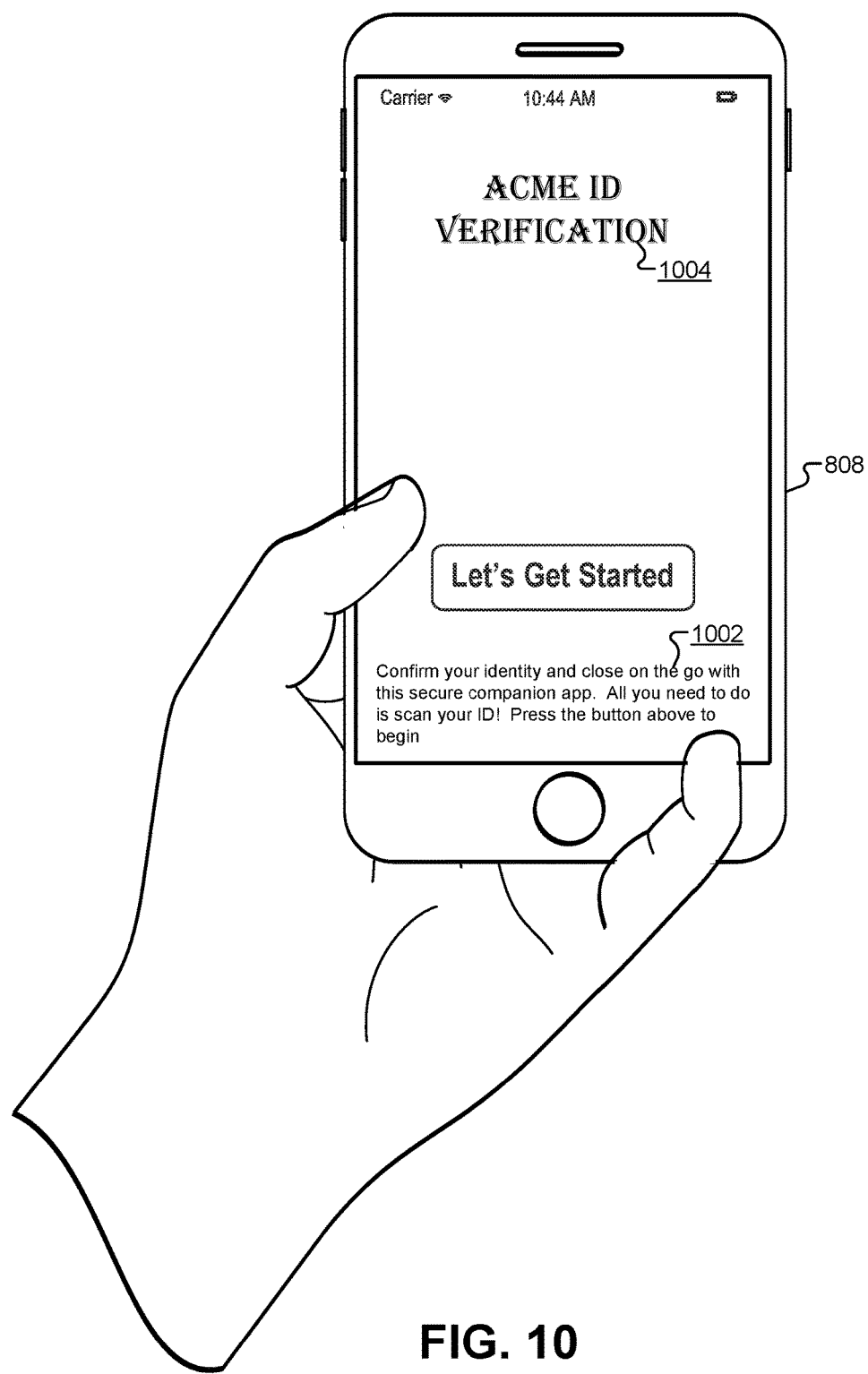
FIG. 10 illustrates a view of the second client device in the form of a smart phone, according to some embodiments.

FIG. 10 illustrates a view of the second client device 808 in the form of a smart phone, according to some embodiments. After downloading and launching the application, the user may be informed by the application about the details of the user identification authentication process. Specifically, the application may display a logo or other identifier 1004 associated with the server. This can give a user confidence that they are still engaged with the same entity with which they are currently interacting on the first client device. The application may also display text 1002 explaining steps in the process such that the user knows what to expect as the authentication process moves forward.

Figure 11:
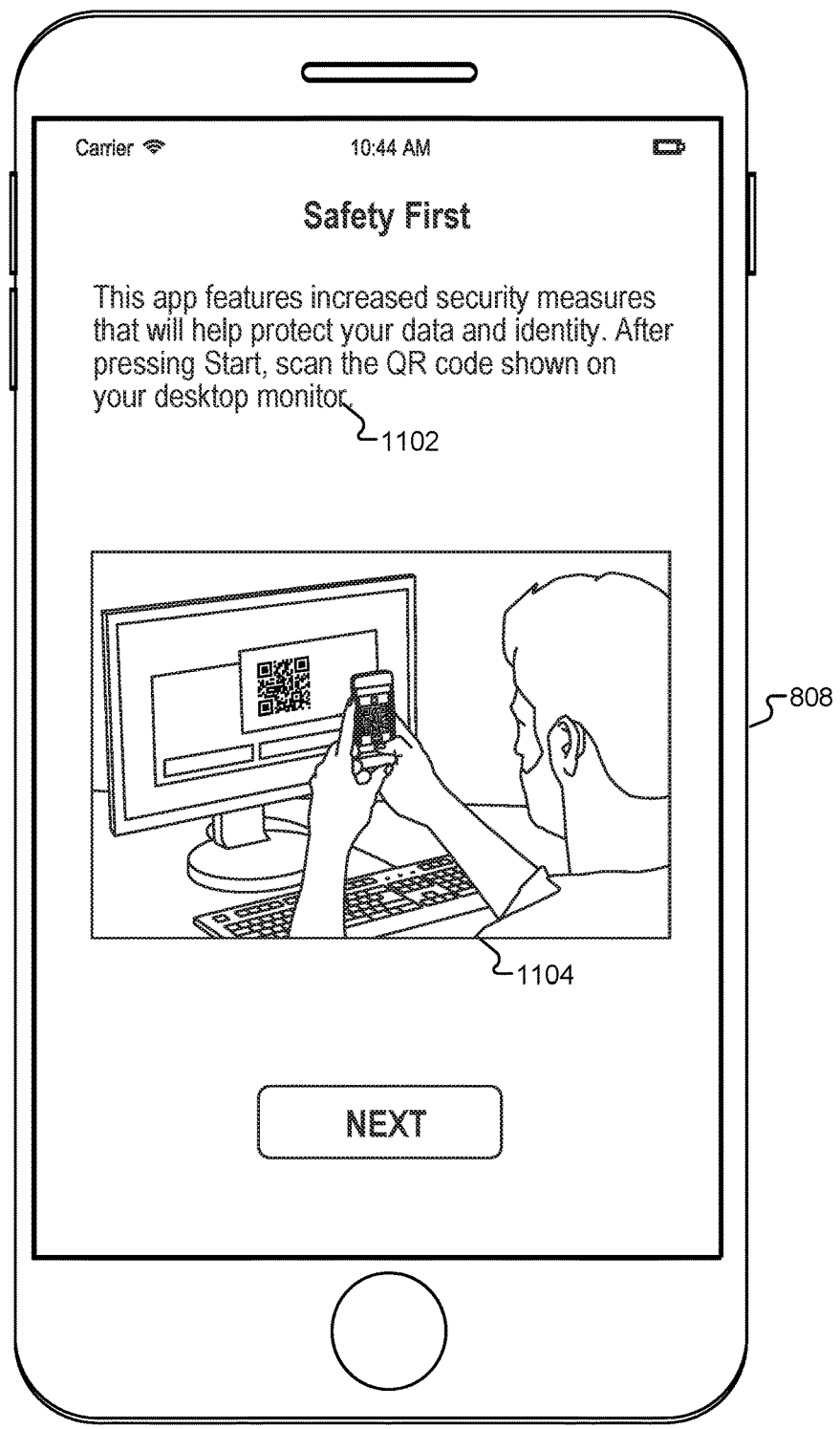
FIG. 11 illustrates a view for a safety/security page displayed by the application, according to some embodiments.

FIG. 11 illustrates a view of a safety/security page displayed by the application, according to some embodiments. Before instructing the user to capture a representation of the user identification, the application may provide instructions that help the user proceed in a safe and secure manner. The instructions may also provide text that reassures the user that the security of the representation of their user identification will be kept secure. Some embodiments may also include pictures 1104 of users completing the authentication process such that the user knows what to expect as they move forward.

Figure 12:
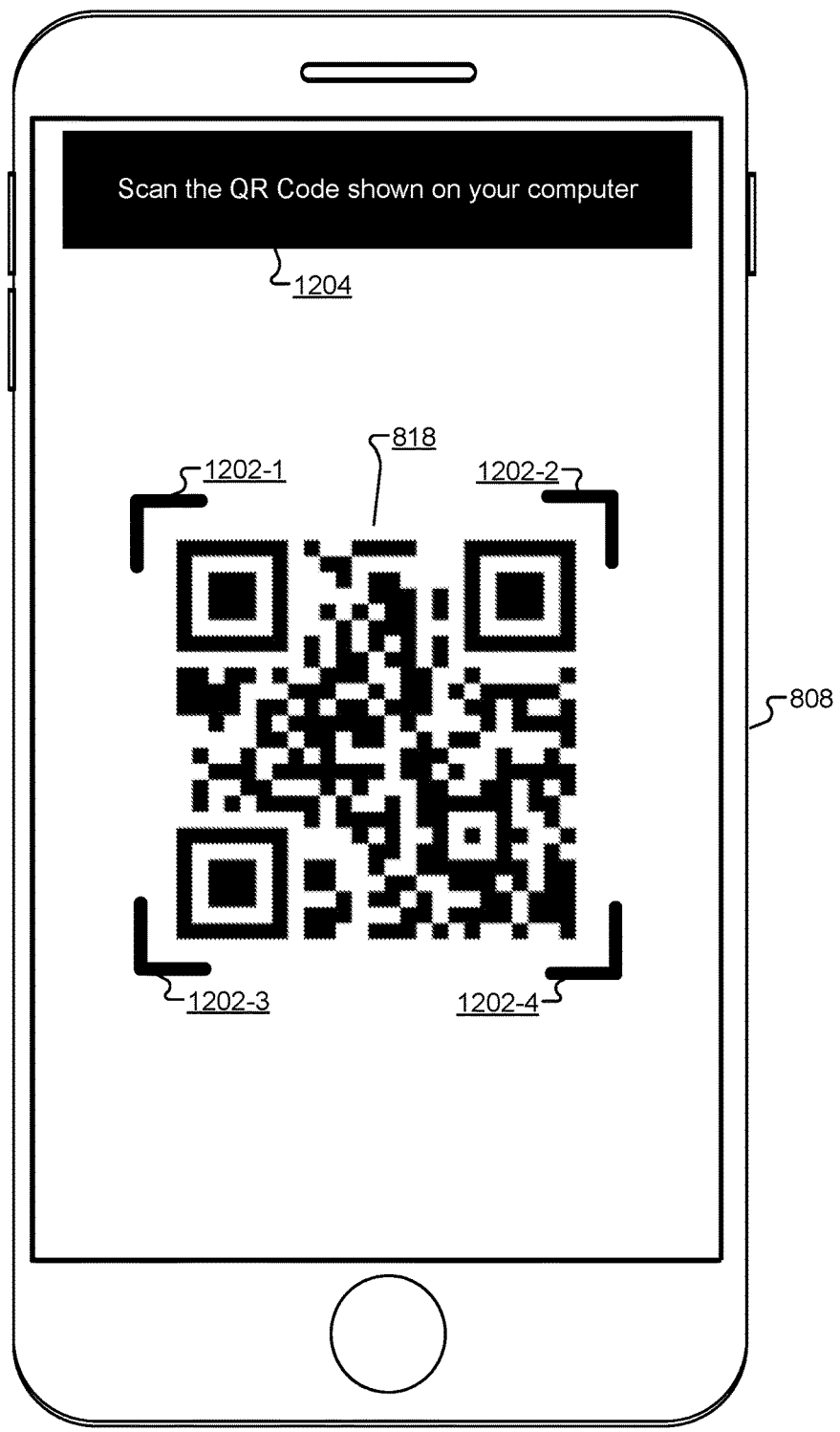
FIG. 12 illustrates how the application can capture a view of the graphic pattern displayed on the first client device, according to some embodiments.

FIG. 12 illustrates how the application can capture a view of the graphic pattern 818 displayed on the first client device, according to some embodiments. The image shown on the screen of the second client device 808 may include a real-time video feed of the camera on a side opposite of the screen. As described above, the instructions provided in the application and/or on the screen of the first client device can instruct the user to capture an image of the graphic pattern 818 displayed on the screen of the first client device using the camera of the second client device 808. The application may include instructions 1204 that ask the user to take a picture of the graphic pattern 818 displayed on the first client device. The application may also include visual indicators 1202 that help the user center the captured image of the graphic pattern 818 in the visual field of the camera. Capturing the image of the graphic pattern 818 allows the application to decode the URL, and the URL can be used to link information retrieved from the application to the interactive communication session at the server.

FIG. 13 illustrates an example of the URL that can be decoded from the graphic pattern, according to some embodiments. As with most URLs, this URL may include a server address that includes web domains and/or subdomains. Additionally, this URL may include identifiers 1302, 1304, 1306 that are appended to the URL. The identifiers 1302, 1304, 1306 may individually or collectively be considered identifiers that identify the interactive communication session. For example, the identifier 1302 may include a global user ID for the user, the identifier 1304 may include a device ID for the first client device, and/or the identifier 1306 may include a package or session ID for the interactive communication session.

In some embodiments, the URL may be encrypted when it is encoded in the graphic pattern. Thus, the second client device may need the application in order to decrypt the URL. This can prevent devices that do not use the application from sending information to the server for user identification authentication. This may be important in some embodiments, because using the application can guarantee that any images that are captured of the user identification are captured during the interactive communication session and not retrieved from a previous storage location, or otherwise faked.

Figure 14:
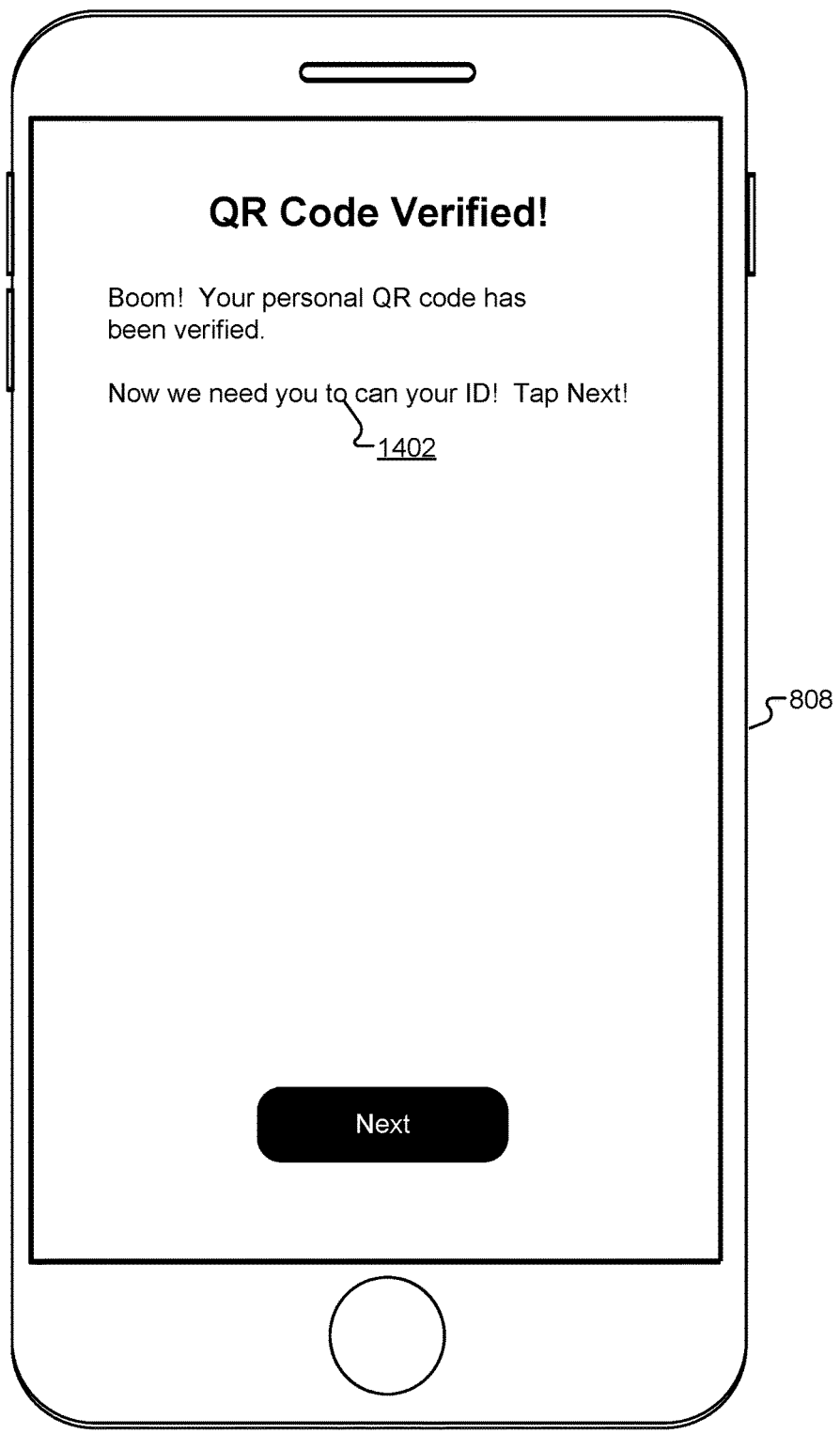
FIG. 14 illustrates an example of graphic pattern verification, according to some embodiments.

FIG. 14 illustrates an example of graphic pattern verification, according to some embodiments. After decoding the URL, the application can verify that the format of the URL is correct. For example, the application can determine that the address of the server is on a preapproved list of servers that can accept authentication information. The application can analyze different fields in the URL to ensure that the URL has not been tampered with. The application can also examine identifiers and addresses to ensure that the URL is complete. This prevents compromising user information in cases where the user may inadvertently use the second client device to read the wrong graphic pattern. This also prevents malicious actors from providing alternate URLs that send user information to incorrect server addresses. When the graphic pattern is verified, the application can display text 1402 that indicates the verification was successful and instructs the user to continue on to the next step in the process.

Figure 15A:
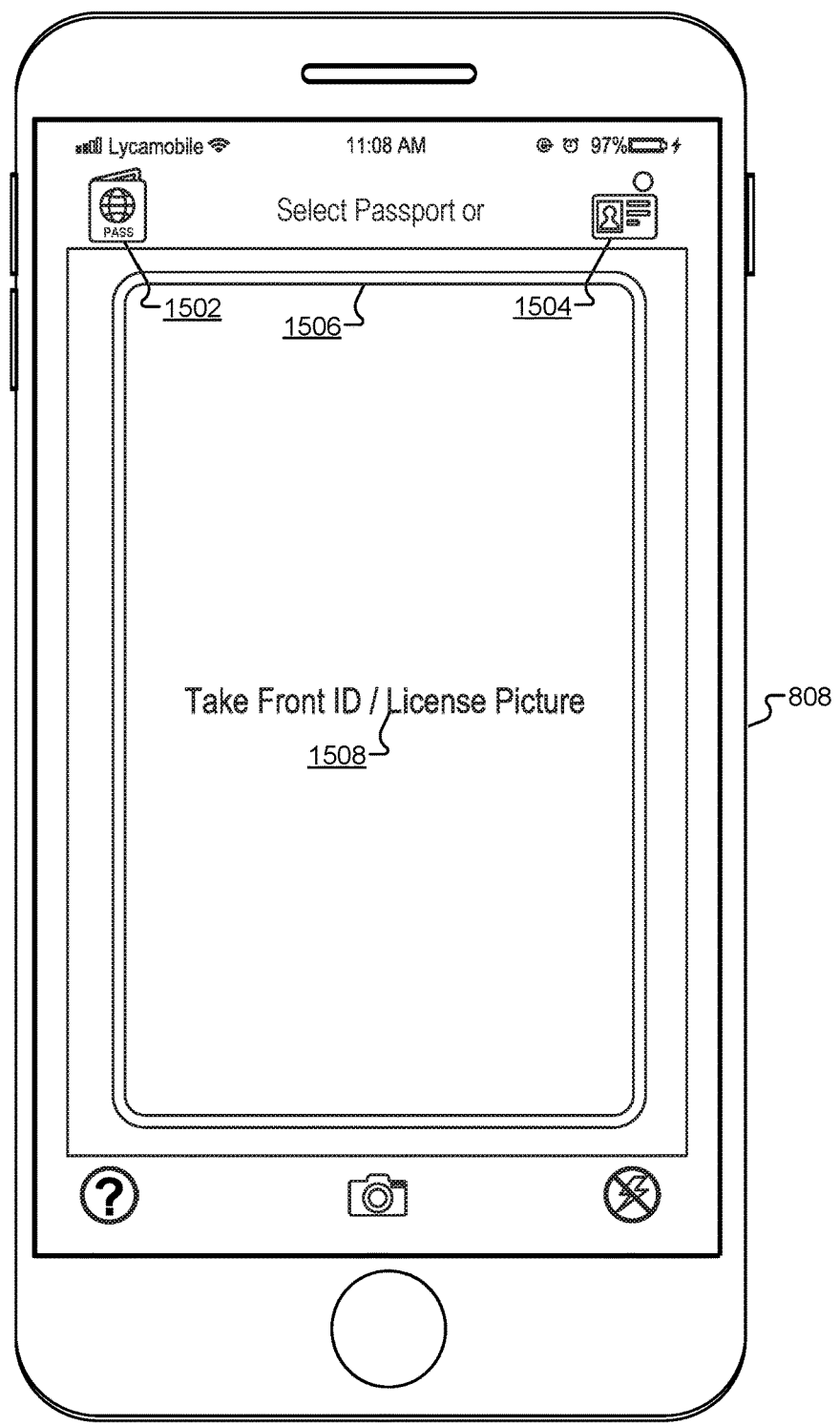
FIG. 15A illustrates an example of how the application can instruct the user to capture a representation of the user identification, according to some embodiments.
Figure 15B:
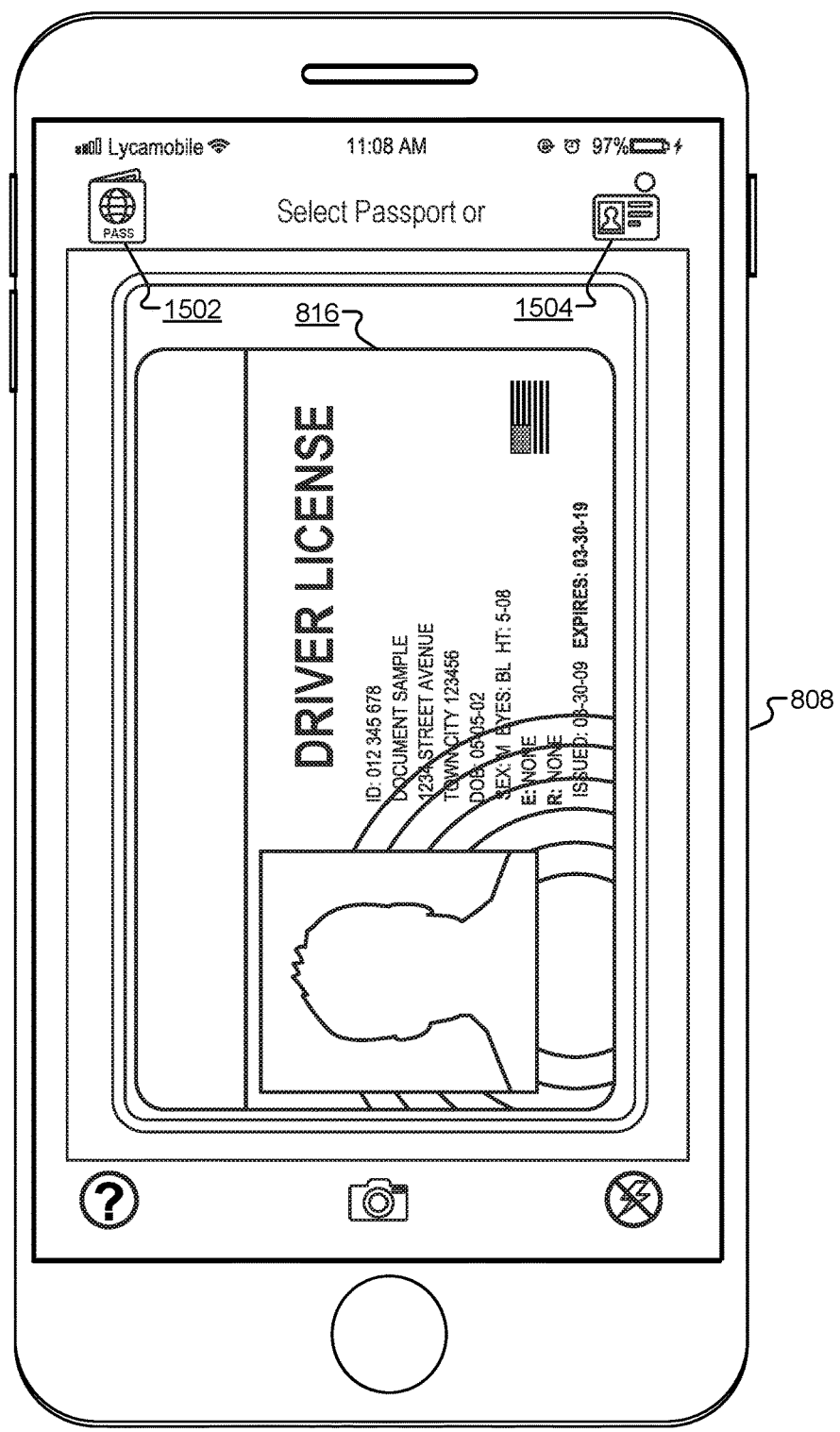
FIG. 15B illustrates an image of the user identification captured by the application.

FIG. 15A illustrates an example of how the application can instruct the user to capture a representation of the user identification, according to some embodiments. The application can provide a number of different options for capturing representations of different types of user identification. For example, the application can allow the user to capture a passport 1502 and/or an identification card 1504. As was the case with the graphic pattern, the application can provide visual indicators 1506 that help the user center the image of the user identification within the field of view of the camera. The application may also include text instructions 1508 that prompt the user to capture an image of the front and/or back of the user identification. FIG. 15B illustrates an image of the user identification 816 captured by the application. In some embodiments, the application can provide visual, audible, and/or tactile indications that the image of the user identification 806 can be properly captured within the visual indicators 1506 displayed by the application.

Figure 16:
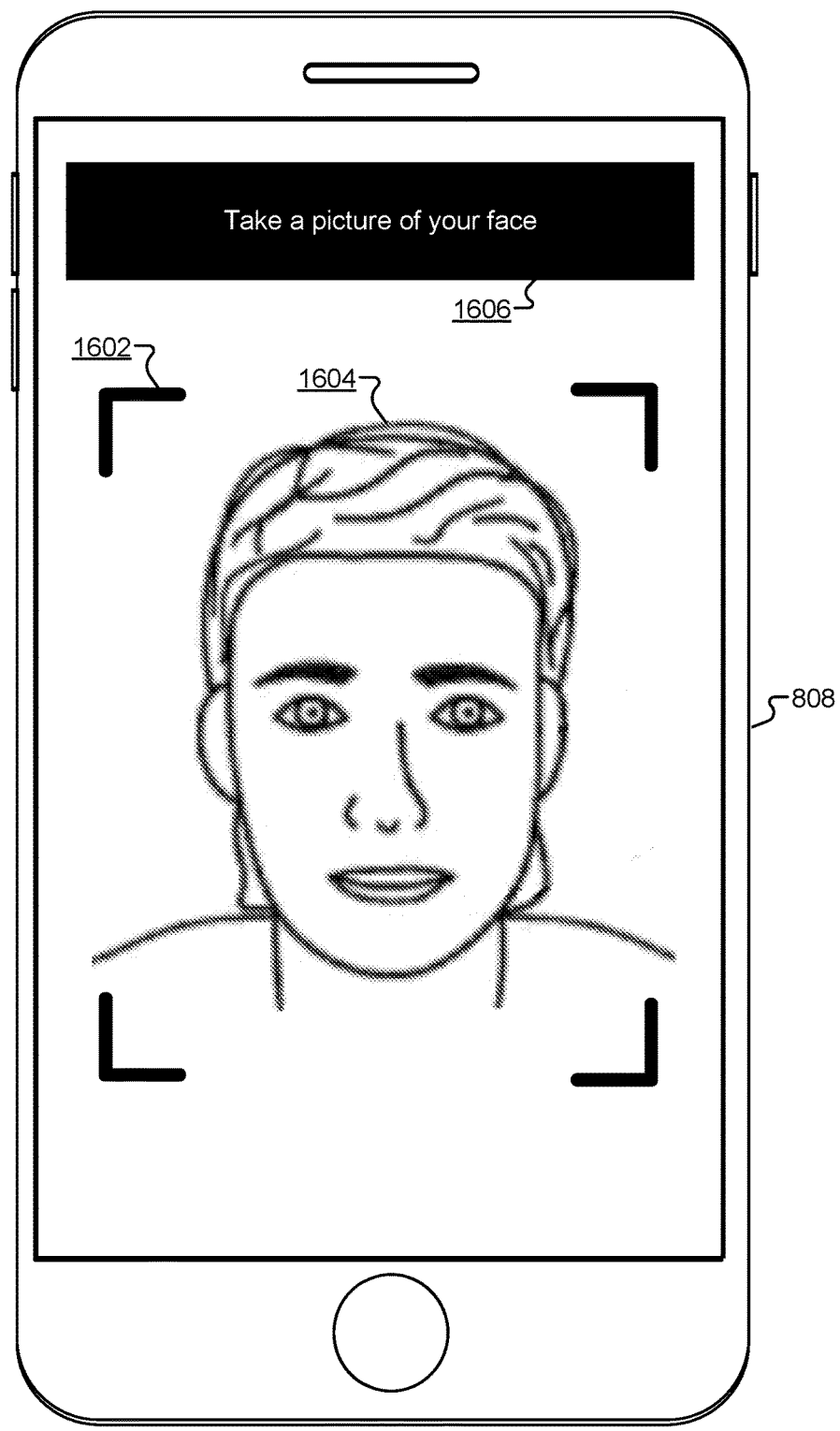
FIG. 16 illustrates an example of how the application can capture a facial image of the user, according to some embodiments.

As described above, some embodiments may also prompt the user to capture a facial image. FIG. 16 illustrates an example of how the application can capture a facial image of the user, according to some embodiments. The application can display text 1606 instructing the user to capture an image of their face. The text 1606 may also indicate to the user that this facial image may be matched to an image on the user identification. The application can display a real-time view of the face 1604 of the user along with visual indicators 1602 that help the user center the image of their face in the field of view of the camera.

In addition to determining whether the user identification itself is an authentic card/document/passport/etc., some embodiments may also verify the identity of the user holding the second client device by matching the face captured by the application to the photo on the user identification. For example, the application and/or the server can use standard facial recognition techniques to analyze/compare the two facial images and determine whether they match. Because the application can ensure that a live image of the user is taken during the interactive communication session, the server can determine that the user at the computer matches the user identification, which matches the name and/or other credentials associated with a user account for the interactive communication session. Thus, the embodiments described herein can verify the authenticity of the user identification as well as authenticate the identity of the actual user.

Figure 17:
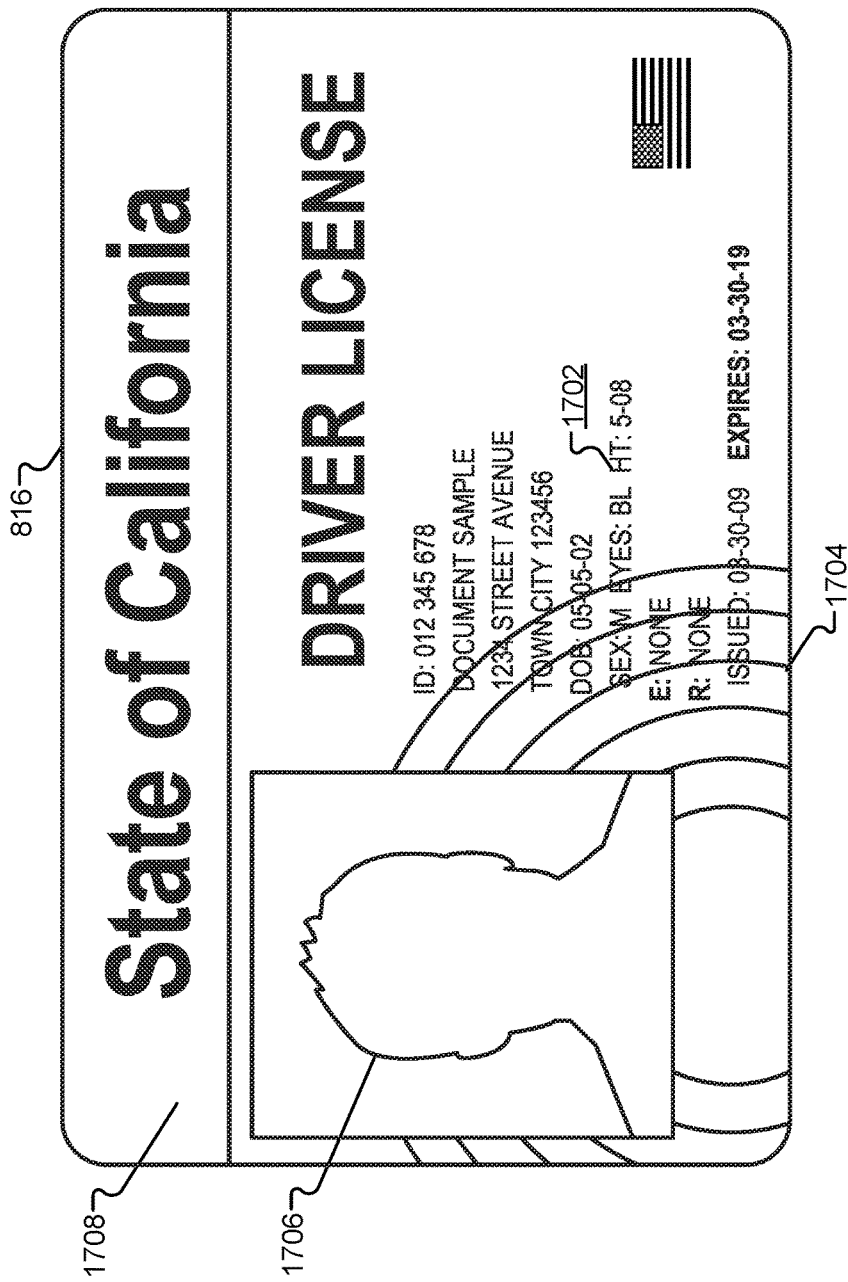
FIG. 17 illustrates an example image of a user identification, according to some embodiments.

FIG. 17 illustrates an example image of a user identification 816, according to some embodiments. In this example, the user identification 816 may take the form of a driver's license. The user identification 816 may include a photo 1706 of the user that can be matched to a stored photo of the user and/or a new facial image of the user captured as described above during the interactive communication session. The user identification 816 may also include graphics 1708 that can be matched to known specifications for that identification type to determine the authenticity of the user identification 816. The user identification 816 may also include text 1702 that can be read using an OCR process, and this text 1702 can be matched with user information from a user account and/or from external, third-party data sources. Additionally, the user identification 816 may include watermarks 1704 or other graphics or visual indicators that can be recognized by the application and/or server using computer vision techniques and used to determine whether the user identification 816 is authentic.

Figure 18B:
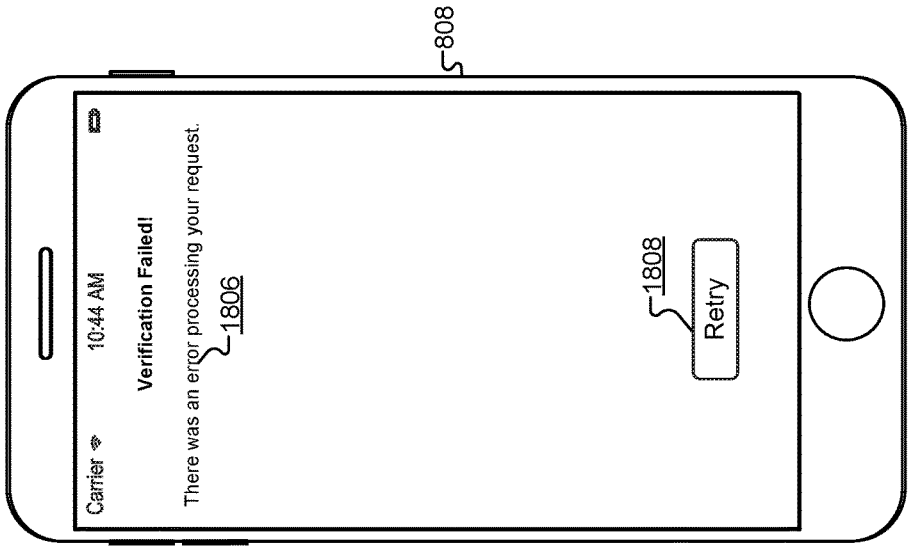
FIG. 18B illustrates an example of how the application can indicate that the user identification has not been properly authenticated, according to some embodiments.
Figure 18A:
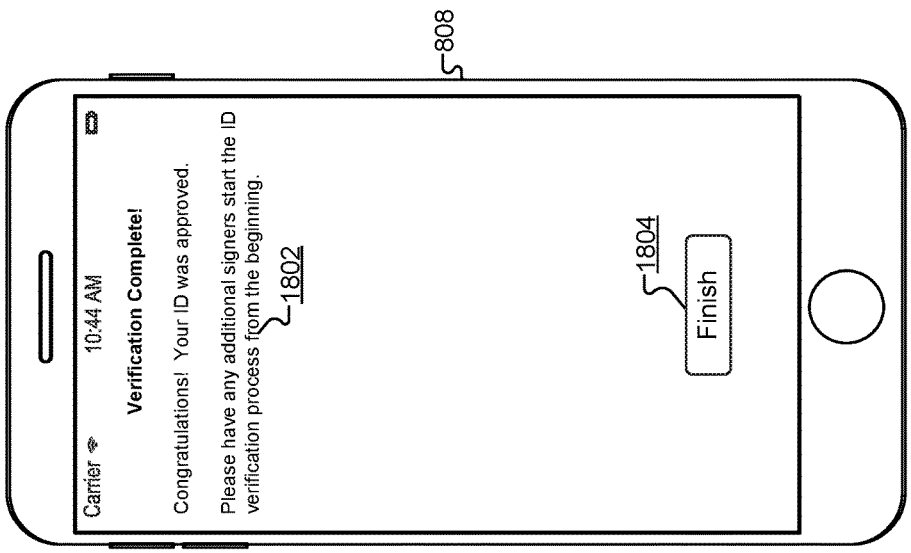
FIG. 18A illustrates an example of how the application can indicate that the user identification has been properly authenticated, according to some embodiments.

FIG. 18A and FIG. 18B illustrate examples of how the application can indicate that the user identification has been properly authenticated, according to some embodiments. When the authentication procedure is successful, the application can display text 1802 indicating the successful completion and instructing the user to continue with the process on the first client device. The application can also display a control 1804 that allows the user to finish the authentication process on the second client device. In some embodiments, the control 1804 may automatically terminate the execution of the application on the second client device. Alternatively, when the authentication process is unsuccessful, the application can display text 1806 indicating that the process was not completed successfully. In some embodiments, the text 1806 may also display reasons for why the authentication process was unsuccessful, such as an identification that could not be authenticated, text that was unreadable, a photo that was not clear, a facial image that was blurry, the detection of identification card features that indicate a forged or invalid card, and so forth. The application may then provide a control 1808 that allows the user to retry the authentication process. Some embodiments may also present alternative methods for authenticating the user identification.

Figure 19:
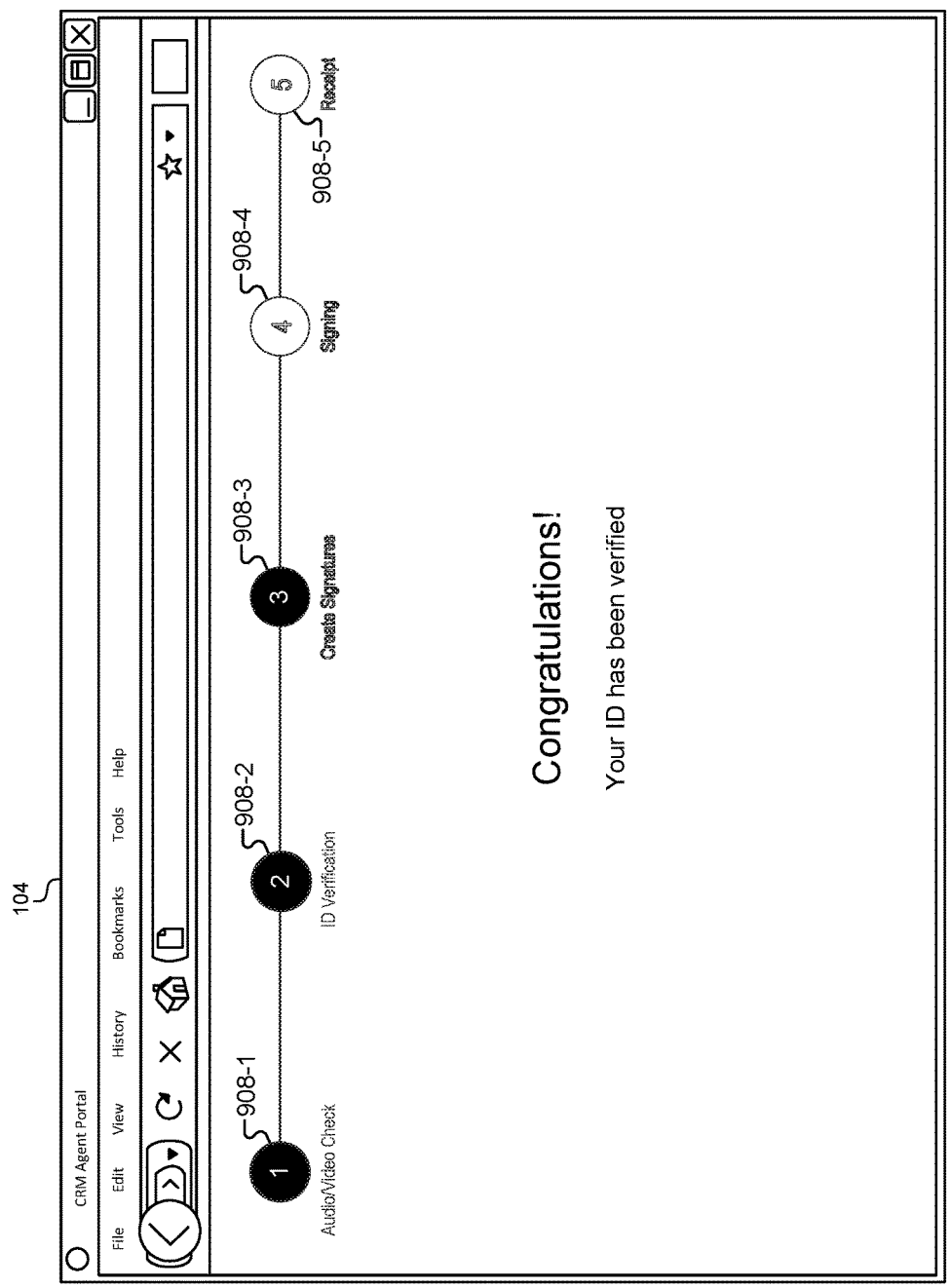
FIG. 19 illustrates an example of how the first client device can indicate that the authentication process was successful, according to some embodiments.

FIG. 19 illustrates an example of how the first client device can indicate that the authentication process was successful, according to some embodiments. As the server receives the transmission from the second client device and determines that the user identification and/or identity are authentic, the server can automatically update the display on the first client device to indicate the success of the authentication process. Additionally, the server may now allow the initiation of a subsequent step in the process. For example, the first client device can indicate that step 908-2 is now complete and that step 908-3 has been initiated. As described above, in cases when the verification is unsuccessful, the first client device can instead display information that describes why the authentication was unsuccessful and/or present alternative authentication methods.

Figure 20:
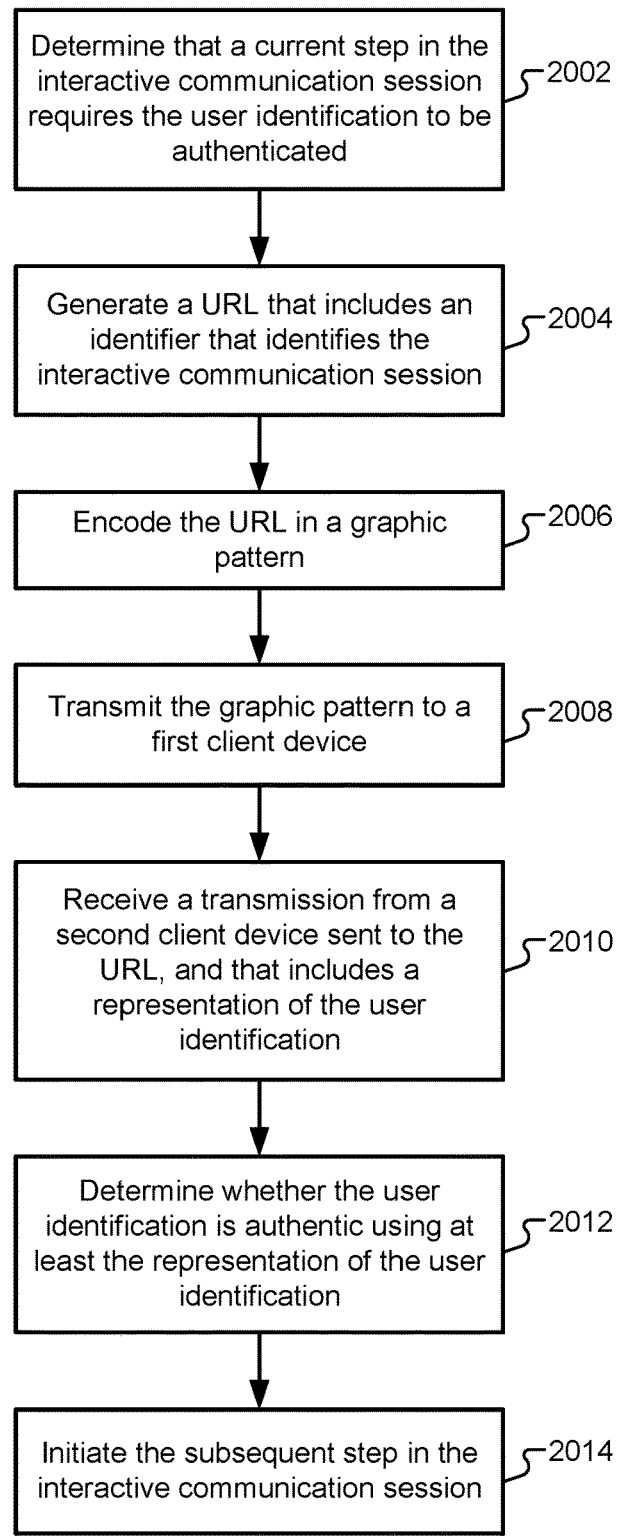
FIG. 20 illustrates a flowchart of a method for authenticating a user identification during an interactive communication session.

FIG. 20 illustrates a flowchart of a method for authenticating a user identification during an interactive communication session, according to some embodiments. This method may be carried out by the server, and is thus presented from the perspective of the server. The method may include determining that a current step in the interactive communication session requires the user identification to be authenticated (2002). This determination may be made after initiating the current step in the interactive communication session and before initiating a subsequent step in the interactive communication session. Note that the "subsequent step" need not be the only available next step in the process. Other steps may be available to be initiated, while only initiation of a step referred to as the "subsequent step" may depend on completion of the authentication process. Therefore, the term "subsequent" simply designates one of what may be a plurality of available "next" steps that depends on successful completion of the authentication process before initiation.

The method may also include generating a URL that includes an identifier that identifies the interactive communication session (2004). The identifier that identifies the interactive communication session may include information such as a user ID, package ID, a device code, and so forth. The URL may be encrypted. The method may additionally include encoding the URL in a graphic pattern (2006). The graphic pattern may include a QR code, a barcode, an alphanumeric string, and/or the like. In some embodiments, encoding the URL in a graphic pattern may include using a base graphical pattern, such as a PDF417 barcode, and appending user information to the base graphic pattern. The method may further include transmitting the graphic pattern to a first client device (2008). The first client device may display the graphic pattern on the screen. The server may also cause the first client device to display instructions for using the second client device to complete the authentication process. Specifically, all of the operations described above may be performed by the first client device and/or the second client device, including downloading the application from the application server, capturing an image of the graphic pattern, decoding the URL, capturing a representation of the user identification, capturing a facial image of the user, and so forth.

The method may also include receiving a transmission from the second client device (2010). This transmission may be sent to the URL and may include the representation of the user identification. This transmission may also include a facial image of the user. This information received in the transmission may also be encrypted. The method may additionally include determining whether the user identification is authentic (2012). This determination may be made using at least the representation of the user identification. Some embodiments may implement this determination by sending the representation of the user identification to an external verification server that is operated by a different entity. The method may further include initiating the subsequent step in the interactive communication session (2014). Initiating the subsequent step may be based at least in part on using the identifier that identifies the interactive communication session in the URL to link the authentication determination to the interactive communication session. Initiating the subsequent step may also be based at least in part on a determination that the user identification is authentic.

Server Computer System

Figure 21:
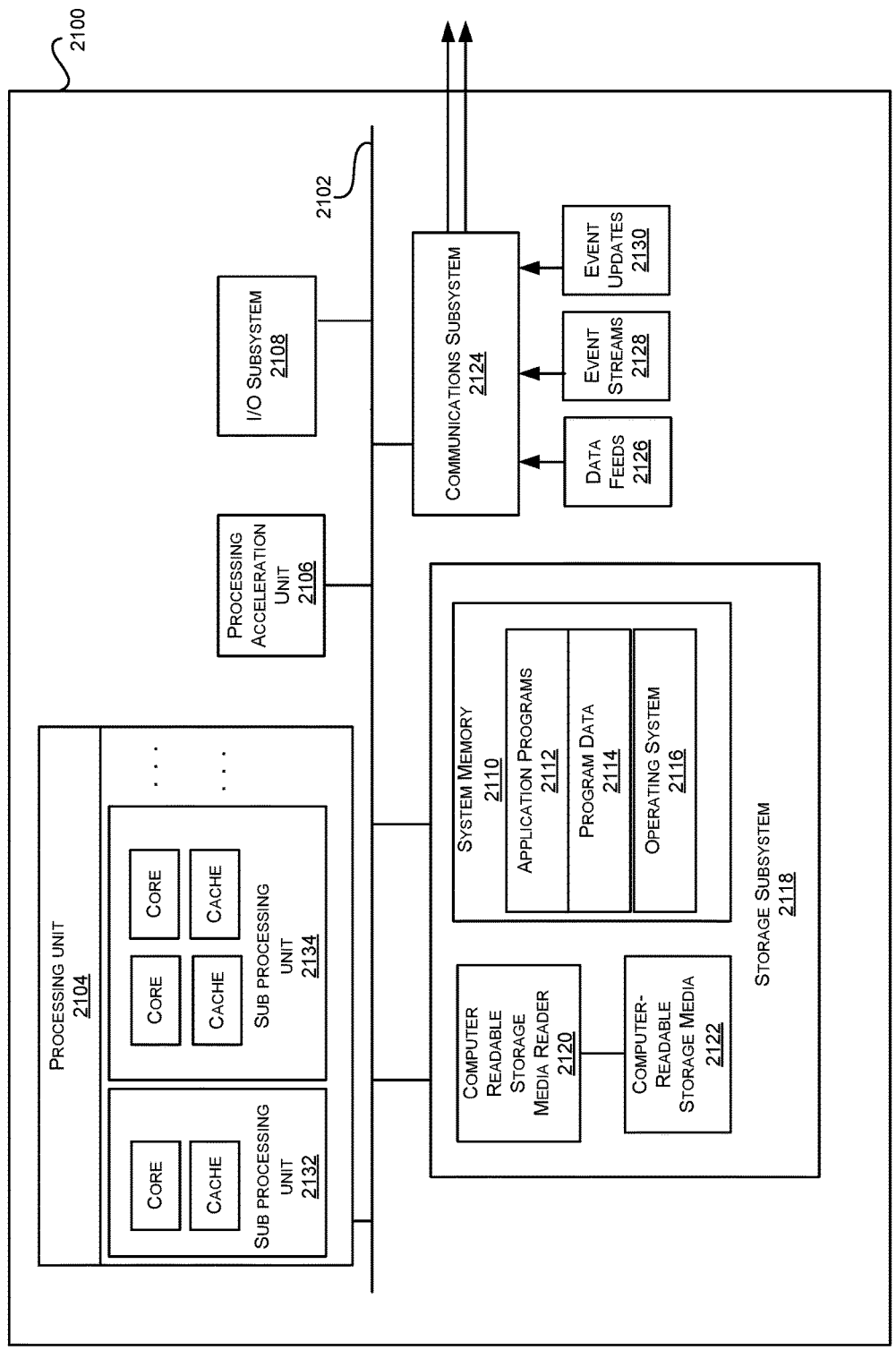
FIG. 21 illustrates an exemplary computer system, in which various embodiments may be implemented.

FIG. 21 illustrates a server computer system 754 described above. As shown in the figure, computer system 2100 includes a processing unit 2104 that communicates with a number of peripheral subsystems via a bus subsystem 2102. These peripheral subsystems may include a processing acceleration unit 2106, an I/O subsystem 2108, a storage subsystem 2118 and a communications subsystem 2124. Storage subsystem 2118 includes tangible computer-readable storage media 2122 and a system memory 2110.

Bus subsystem 2102 provides a mechanism for letting the various components and subsystems of computer system 2100 communicate with each other as intended. Although bus subsystem 2102 is shown schematically as a single bus, alternative embodiments of the bus subsystem may utilize multiple buses. Bus subsystem 2102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2104, which can be implemented as one or more integrated circuits (e.g., a conventional microprocessor or microcontroller), controls the operation of computer system 2100. One or more processors may be included in processing unit 2104. These processors may include single core or multicore processors. In certain embodiments, processing unit 2104 may be implemented as one or more independent processing units 2132 and/or 2134 with single or multicore processors included in each processing unit. In other embodiments, processing unit 2104 may also be implemented as a quad-core processing unit formed by integrating two dual-core processors into a single chip.

In various embodiments, processing unit 2104 can execute a variety of programs in response to program code and can maintain multiple concurrently executing programs or processes. At any given time, some or all of the program code to be executed can be resident in processor(s) 2104 and/or in storage subsystem 2118. Through suitable programming, processor(s) 2104 can provide various functionalities described above. Computer system 2100 may additionally include a processing acceleration unit 2106, which can include a digital signal processor (DSP), a special-purpose processor, and/or the like.

I/O subsystem 2108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2100 may comprise a storage subsystem 2118 that comprises software elements, shown as being currently located within a system memory 2110. System memory 2110 may store program instructions that are loadable and executable on processing unit 2104, as well as data generated during the execution of these programs.

Depending on the configuration and type of computer system 2100, system memory 2110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2104. In some implementations, system memory 2110 may include multiple different types of memory, such as static random access memory (SRAM) or dynamic random access memory (DRAM). In some implementations, a basic input/output system (BIOS), containing the basic routines that help to transfer information between elements within computer system 2100, such as during start-up, may typically be stored in the ROM. By way of example, and not limitation, system memory 2110 also illustrates application programs 2112, which may include client applications, Web browsers, mid-tier applications, relational database management systems (RDBMS), etc., program data 2114, and an operating system 2116. By way of example, operating system 2116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2118 may also provide a tangible computer-readable storage medium for storing the basic programming and data constructs that provide the functionality of some embodiments. Software (programs, code modules, instructions) that when executed by a processor provide the functionality described above may be stored in storage subsystem 2118. These software modules or instructions may be executed by processing unit 2104. Storage subsystem 2118 may also provide a repository for storing data used in accordance with the present invention.

Storage subsystem 2100 may also include a computer-readable storage media reader 2120 that can further be connected to computer-readable storage media 2122. Together and, optionally, in combination with system memory 2110, computer-readable storage media 2122 may comprehensively represent remote, local, fixed, and/or removable storage devices plus storage media for temporarily and/or more permanently containing, storing, transmitting, and retrieving computer-readable information.

Computer-readable storage media 2122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2100.

By way of example, computer-readable storage media 2122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2122 may include, but is not limited to, Zip® drives, flash memory cards, universal serial bus (USB) flash drives, secure digital (SD) cards, DVD disks, digital video tape, and the like. Computer-readable storage media 2122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2100.

Communications subsystem 2124 provides an interface to other computer systems and networks. Communications subsystem 2124 serves as an interface for receiving data from and transmitting data to other systems from computer system 2100. For example, communications subsystem 2124 may enable computer system 2100 to connect to one or more devices via the Internet. In some embodiments communications subsystem 2124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2124 can provide wired network connectivity (e.g., Ethernet) in addition to or instead of a wireless interface.

In some embodiments, communications subsystem 2124 may also receive input communication in the form of structured and/or unstructured data feeds 2126, event streams 2128, event updates 2130, and the like on behalf of one or more users who may use computer system 2100.

By way of example, communications subsystem 2124 may be configured to receive data feeds 2126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2124 may also be configured to receive data in the form of continuous data streams, which may include event streams 2128 of real-time events and/or event updates 2130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2124 may also be configured to output the structured and/or unstructured data feeds 2126, event streams 2128, event updates 2130, and the like to one or more databases that may be in communication with one or more streaming data source computers coupled to computer system 2100.

Computer system 2100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method of authenticating a user identification card during an interactive communication session, the method comprising:
    determining, at a server, that a current step in the interactive communication session requires the user identification card to be authenticated after initiating the current step in the interactive communication session and before initiating a subsequent step in the interactive communication session;
    providing a link to an application server from the server to a first client device;
    generating, at the server, a Uniform Resource Locator (URL) that comprises an identifier that identifies the interactive communication session;
    encoding, at the server, the URL in a graphic pattern;
    transmitting, from the server, the graphic pattern to a first client device;
    receiving, at the server, a transmission from an application operating on a second client device, wherein the transmission is sent to the URL, the transmission comprises a representation of the user identification card, and the application is downloaded from the application server by the second client device using the link to the application server;
    determining whether the user identification card is authentic using at least the representation of the user identification card; and
    initiating, at the server, the subsequent step in the interactive communication session based at least in part on the identifier that identifies the interactive communication session in the URL and a determination that the user identification card is authentic.

2. The method of claim 1, further comprising transmitting the link to the application server from the server to the first client device.

3. The method of claim 1, further comprising receiving, at the server and from the first client device, a number for the second client device.

4. The method of claim 3, further comprising sending the link to the application server to the second client device using the number for the second client device.

5. The method of claim 1, further comprising causing the graphic pattern to be displayed on a screen on the first client device.

6. The method of claim 5, further comprising causing instructions to be displayed on a screen on the first client device, wherein the instructions instruct a user to capture an image of the graphic pattern as displayed on the first client device using a camera of the second client device.

7. The method of claim 1, wherein the interactive communication session comprises an online monetary transaction.

8. A computer-readable, non-transitory medium comprising instructions that, when executed by one or more processors, cause the one or more processors to perform operations comprising:
    determining that a current step in an interactive communication session requires a user identification card to be authenticated after initiating the current step in the interactive communication session and before initiating a subsequent step in the interactive communication session;
    generating a URL that comprises an identifier that identifies the interactive communication session;
    encoding the URL in a graphic pattern;
    transmitting the graphic pattern to a first client device;
    receiving a transmission from an application operating on a second client device, wherein the transmission is sent to the URL, the transmission comprises a representation of the user identification card, and the application is downloaded from an application server by the second client device using a link to the application server;
    determining whether the user identification card is authentic using at least the representation of the user identification card; and
    initiating the subsequent step in the interactive communication session based at least in part on the identifier that identifies the interactive communication session in the URL and a determination that the user identification card is authentic.

9. The computer-readable, non-transitory medium of claim 8, wherein the representation of the user identification card comprises front and back photographs of the user identification card captured by a camera of the second client device.

10. The computer-readable, non-transitory medium of claim 8, wherein determining that the user identification card is authentic comprises sending at least the representation of the user identification card to a verification server.

11. The computer-readable, non-transitory medium of claim 8, wherein the transmission from the second client device further comprises a facial image of a user associated with the user identification card, wherein the facial image is captured by the second client device after initiating the current step in the interactive communication session.

12. The computer-readable, non-transitory medium of claim 11, wherein determining that the user identification card is authentic comprises a determination that the facial image of the user matches a photo on the user identification card.

13. The computer-readable, non-transitory medium of claim 8, wherein the identifier that identifies the interactive communication session comprises a package identifier that identifies a closing process associated with the user identification card.

14. The computer-readable, non-transitory medium of claim 8, wherein the identifier that identifies the interactive communication session comprises a user identifier and a device code.

15. A system comprising:
   one or more processors;
   one or more memory devices comprising instructions that, when executed by the one or more processors, cause the one or more processors to perform operations comprising:
      providing a link to an application server to a first client device;
      generating a URL that comprises an identifier that identifies an interactive communication session;
      encoding the URL in a graphic pattern;
      transmitting the graphic pattern to a first client device;
      receiving a transmission from an application operating on the second client device, wherein a transmission is sent to the URL, the transmission comprises a representation of a user identification card, and the application is downloaded from the application server by the second client device using the link to the application server;
      determining whether the user identification card is authentic using at least the representation of the user identification card; and
      initiating a subsequent step in the interactive communication session based at least in part on the identifier that identifies the interactive communication session in the URL and a determination that the user identification card is authentic.

16. The system of claim 15, wherein the graphic pattern further encodes a link to an application server where the second client device can download an application.

17. The system of claim 15, wherein the second client device comprises a mobile phone with a camera.

18. The system of claim 15, wherein the user identification card comprises a photo identification.

19. The system of claim 15, wherein the first client device comprises a desktop or laptop computer.

20. The system of claim 15, wherein the second client device operates an application downloaded from an application server after initiating the current step in the interactive communication session.

* * * * *